United States Patent
Dally

(10) Patent No.: US 9,804,621 B2
(45) Date of Patent: Oct. 31, 2017

(54) CURRENT-PARKING SWITCHING REGULATOR DOWNSTREAM CONTROLLER PRE-DRIVER

(71) Applicant: NVIDIA Corporation, Santa Clara, CA (US)

(72) Inventor: William J. Dally, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 21 days.

(21) Appl. No.: 13/759,964

(22) Filed: Feb. 5, 2013

(65) Prior Publication Data

US 2014/0218001 A1    Aug. 7, 2014

(51) Int. Cl.
   *G05F 1/618*   (2006.01)
   *H02M 1/00*    (2006.01)
   (Continued)

(52) U.S. Cl.
   CPC .............. *G05F 1/618* (2013.01); *G06F 1/26* (2013.01); *H02M 1/00* (2013.01); *H02M 3/158* (2013.01);
   (Continued)

(58) Field of Classification Search
   CPC . G05F 1/613; G05F 1/56; G05F 1/575; G05F 1/24; H02M 3/158; H02M 3/1588;
   (Continued)

(56) References Cited

U.S. PATENT DOCUMENTS 5,367,247 A * 11/1994 Blocher et al. ............... 323/222
5,488,552 A     1/1996 Sakamoto et al.
(Continued)

FOREIGN PATENT DOCUMENTS

CN    101018014 A    8/2007
CN    101090234 A    12/2007
(Continued)

OTHER PUBLICATIONS

Non-Final Office Action from U.S. Appl. No. 13/752,289, dated Oct. 6, 2014.
(Continued)

*Primary Examiner* — Jue Zhang
*Assistant Examiner* — Kevin H Sprenger
(74) *Attorney, Agent, or Firm* — Zilka-Kotab, PC

(57) ABSTRACT

A system and method are provided for generating non-overlapping enable signals. A peak voltage level is measured at an output of a current source that is configured to provide current to a voltage control mechanism. The non-overlapping enable signals are generated for the voltage control mechanism based on the peak voltage level. A system includes the current source, a downstream controller, and the voltage control mechanism that is coupled to the load. The current source is configured to provide current to the voltage control mechanism. The controller is configured to measure the peak voltage level at the output of the current source and generate the non-overlapping enable signals based on the peak voltage level. The non-overlapping enable signals provide a portion of the current to the load.

22 Claims, 17 Drawing Sheets

(51) Int. Cl.
  *G06F 1/26* (2006.01)
  *H02M 3/158* (2006.01)
(52) U.S. Cl.
  CPC ........ *H02M 3/1584* (2013.01); *H02M 3/1582* (2013.01)
(58) Field of Classification Search
  CPC .. H02M 3/1582; H02M 3/1584; H02M 3/156; H02M 3/07; H02M 3/33507; H02M 3/157; H02M 2001/0045; H02M 2001/0032; H02M 2001/0012; H02M 3/155
  USPC ....... 323/223–225, 259, 265, 268, 271, 272, 323/282–288
  See application file for complete search history.

(56) References Cited

U.S. PATENT DOCUMENTS

| | | | |
|---|---|---|---|
| 5,552,694 A | 9/1996 | Appeltans | |
| 5,600,234 A * | 2/1997 | Hastings et al. | 323/282 |
| 6,191,567 B1 | 2/2001 | Sluijs | |
| 6,636,022 B2 | 10/2003 | Sluijs | |
| 6,788,033 B2 * | 9/2004 | Vinciarelli | H02M 3/1582 323/225 |
| 6,798,177 B1 | 9/2004 | Liu et al. | |
| 6,961,251 B2 | 11/2005 | Porter et al. | |
| 7,078,882 B2 | 7/2006 | Weng et al. | |
| 7,141,957 B2 | 11/2006 | Tolle et al. | |
| 7,298,116 B2 | 11/2007 | Sluijs | |
| 7,327,124 B2 | 2/2008 | Liu et al. | |
| 7,495,419 B1 | 2/2009 | Ju | |
| 7,501,805 B2 | 3/2009 | Chen et al. | |
| 7,557,554 B2 | 7/2009 | Chang | |
| 7,733,072 B2 | 6/2010 | Kanakubo | |
| 7,782,027 B2 * | 8/2010 | Williams | 323/266 |
| 7,852,056 B2 | 12/2010 | Nishida | |
| 7,906,943 B2 | 3/2011 | Isobe et al. | |
| 7,906,949 B1 | 3/2011 | Sutardja et al. | |
| 7,977,930 B2 | 7/2011 | Chang | |
| 8,076,914 B2 | 12/2011 | Shimizu | |
| 8,111,052 B2 * | 2/2012 | Glovinsky | 323/225 |
| 8,237,421 B1 * | 8/2012 | Shahani | 323/282 |
| 8,508,208 B2 | 8/2013 | Klein | |
| 8,513,935 B2 | 8/2013 | Brokaw | |
| 8,674,667 B2 * | 3/2014 | Lin et al. | 323/266 |
| 8,710,814 B1 | 4/2014 | Wile | |
| 8,710,820 B2 * | 4/2014 | Parker | 323/288 |
| 8,729,881 B2 | 5/2014 | Chang | |
| 8,773,084 B2 | 7/2014 | Casey et al. | |
| 8,860,387 B2 | 10/2014 | Kobayashi | |
| 8,957,644 B2 * | 2/2015 | Mao | H02M 3/1582 323/259 |
| 9,389,617 B2 | 7/2016 | Dally | |
| 9,395,738 B2 | 7/2016 | Dally | |
| 9,459,635 B2 | 10/2016 | Dally | |
| 9,639,102 B2 | 5/2017 | Dally | |
| 2001/0046145 A1 | 11/2001 | Oknaian et al. | |
| 2002/0093315 A1 | 7/2002 | Sluijs | |
| 2002/0145891 A1 | 10/2002 | Ling | |
| 2004/0119446 A1 | 6/2004 | Harrington et al. | |
| 2005/0007080 A1 | 1/2005 | Wake | |
| 2005/0024908 A1 | 2/2005 | Gizara | |
| 2005/0068794 A1 | 3/2005 | Weng et al. | |
| 2005/0180236 A1 | 8/2005 | Thiele et al. | |
| 2005/0206358 A1 | 9/2005 | Van Der Horn et al. | |
| 2005/0258889 A1 | 11/2005 | Tolle et al. | |
| 2005/0280402 A1 * | 12/2005 | Nitta | H02M 3/1582 323/259 |
| 2006/0043943 A1 | 3/2006 | Huang et al. | |
| 2006/0072252 A1 | 4/2006 | Sluijs | |
| 2007/0114985 A1 | 5/2007 | Latham et al. | |
| 2008/0055940 A1 | 3/2008 | Lawson et al. | |
| 2008/0150508 A1 | 6/2008 | Sohma | |
| 2008/0158915 A1 | 7/2008 | Williams | |
| 2008/0191678 A1 * | 8/2008 | Feldtkeller et al. | 323/282 |
| 2008/0252273 A1 | 10/2008 | Woo et al. | |
| 2008/0252276 A1 | 10/2008 | Omet et al. | |
| 2008/0303502 A1 | 12/2008 | Haiplik | |
| 2008/0315850 A1 | 12/2008 | Nishida | |
| 2009/0039852 A1 | 2/2009 | Fishelov et al. | |
| 2009/0059630 A1 * | 3/2009 | Williams | 363/60 |
| 2009/0079409 A1 | 3/2009 | Chang | |
| 2009/0115392 A1 | 5/2009 | Shimizu | |
| 2009/0262556 A1 * | 10/2009 | Tomiyoshi | H02M 3/1582 363/17 |
| 2009/0295343 A1 | 12/2009 | Chiu | |
| 2009/0302813 A1 * | 12/2009 | Schoofs | H02M 1/15 323/259 |
| 2010/0194369 A1 | 8/2010 | Nagai et al. | |
| 2010/0231186 A1 | 9/2010 | Chen et al. | |
| 2010/0237845 A1 | 9/2010 | Scaldaferri et al. | |
| 2011/0043172 A1 * | 2/2011 | Dearn | H02M 3/1582 323/259 |
| 2011/0156481 A1 | 6/2011 | Lin et al. | |
| 2011/0241637 A1 | 10/2011 | Parker | |
| 2012/0001610 A1 | 1/2012 | Klein | |
| 2012/0074916 A1 * | 3/2012 | Trochut | 323/271 |
| 2012/0078556 A1 | 3/2012 | Holmberg et al. | |
| 2012/0105034 A1 | 5/2012 | Brown et al. | |
| 2012/0105038 A1 * | 5/2012 | Chen | H02M 3/1582 323/283 |
| 2012/0153921 A1 | 6/2012 | Brokaw | |
| 2012/0217946 A1 | 8/2012 | Ju | |
| 2012/0229111 A1 | 9/2012 | Serdarevic | |
| 2012/0262140 A1 * | 10/2012 | Divan | 323/282 |
| 2012/0262142 A1 * | 10/2012 | Chen | H02M 3/1582 323/284 |
| 2013/0193941 A1 * | 8/2013 | DeFazio | G05F 1/46 323/282 |
| 2013/0242616 A1 * | 9/2013 | Oldenkamp | 363/16 |
| 2014/0002053 A1 | 1/2014 | Wang et al. | |
| 2014/0084883 A1 * | 3/2014 | Tanabe | 323/271 |
| 2014/0097813 A1 | 4/2014 | Dally | |
| 2014/0210429 A1 | 7/2014 | Dally | |
| 2014/0210434 A1 | 7/2014 | Dally | |
| 2014/0225579 A1 | 8/2014 | Dally | |
| 2014/0232360 A1 | 8/2014 | Dally | |
| 2014/0232361 A1 | 8/2014 | Dally | |

FOREIGN PATENT DOCUMENTS

| | | |
|---|---|---|
| CN | 101167239 A | 4/2008 |
| CN | 101202510 A | 6/2008 |
| CN | 101330253 A | 12/2008 |
| CN | 101976960 A | 2/2011 |
| CN | 102064697 A | 5/2011 |
| CN | 102265234 A | 11/2011 |
| CN | 102315774 A | 1/2012 |
| CN | 102742135 A | 10/2012 |
| DE | 4334128 A1 | 4/1994 |
| DE | 10243885 A1 | 4/2004 |
| DE | 102013219793 A1 | 4/2014 |
| DE | 102013114656 A1 | 7/2014 |
| DE | 102013114097 A1 | 8/2014 |
| DE | 102013114588 A1 | 8/2014 |
| EP | 0508673 B1 | 6/1998 |
| TW | 200721650 | 6/2006 |
| TW | 1278171 B | 4/2007 |
| TW | I299606 B | 8/2008 |
| TW | 200843311 A | 11/2008 |
| WO | 2011029875 A2 | 3/2011 |
| WO | 2012062375 A1 | 5/2012 |
| WO | WO2012176006 A1 | 12/2012 |

OTHER PUBLICATIONS

Non-Final Office Action from U.S. Appl. No. 13/754,791, dated Sep. 11, 2014.
Non-Final Office Action from U.S. Appl. No. 13/763,516, dated Oct. 7, 2014.

(56) References Cited

OTHER PUBLICATIONS

Non-Final Office Action from U.S. Appl. No. 13/770,982, dated Dec. 5, 2014.
Examination Report from German Patent Application No. 10 2013 114 248.6, dated Aug. 8, 2014.
Examination Report from German Patent Application No. 10 2013 114 656.2, dated Aug. 7, 2014.
Examination Report from German Patent Application No. 10 2013 114 588.4, dated Aug. 7, 2014.
Examination Report from German Patent Application No. 10 2013 114 097.1, dated Sep. 4, 2014.
Examination Report from German Patent Application No. 10 2013 114 331.8, dated Sep. 4, 2014.
Billings et al., "Switchmode Power Supply: Handbook," McGraw Hill, Third Edition, 2011, pp. 1.145-1.150; pp. 2.163-2.176; pp. 3.119-3.155.
Infineon, "High Current PN Half Bridge NovalithIC," Automotive Power, BTN7930 Data Sheet, Rev. 1.1, Nov. 2007, pp. 1-28.
Redl et al., "Ripple-Based Control of Switching Regulators—An Overview," IEEE Transaction on Power Electronics, vol. 24, No. 12, Dec. 2009, pp. 2669-2680.
Yousefzadeh et al., "Proximate Time-Optimal Digital Control for Synchronous Buck DC—DC Converters," EEE Transaction on Power Electronics, vol. 23, No. 4, Jul. 2008, pp. 2018-2026.
Final Office Action from U.S. Appl. No. 13/754,791, dated Apr. 20, 2015.
Rao S. et al., "1.2-Buck-Boost LED Driver With On-Chip Error Averaged SenseFET-Based Current Sensing Technique," IEEE Journal of Solid-State Circuits, vol. 46, No. 12, Dec. 2011, pp. 1-12.
Mengmeng Du et al., "An Integrated Speed- and Accuracy-Enhanced CMOS Current Sensor With Dynamically Biased Shunt Feedback for Current-Mode Buck Regulators," IEEE Transactions on Circuits and Systems-I: Regular Papers, vol. 57, No. 10, Oct. 2010, pp. 2804-2814.
Non-Final Office Action from U.S. Appl. No. 13/770,975, dated May 11, 2015.
Non-Final Office Action from U.S. Appl. No. 13/752,289, dated Jun. 8, 2015.
Final Office Action from U.S. Appl. No. 13/770,982, dated Jul. 16, 2015.
Advisory Action from U.S. Appl. No. 13/754,791, dated Jul. 9, 2015.
Final Office Action from U.S. Appl. No. 13/763,516, dated Jun. 19, 2015.
Final Office Action from U.S. Appl. No. 13/752,289, dated Oct. 6, 2015.
Notice of Allowance from U.S. Appl. No. 13/770,975, dated Nov. 6, 2015.
Advisory Action from U.S. Appl. No. 13/770,982, dated Oct. 6, 2015.
Office Action from Chinese Patent Application No. 201310745918.4, dated Dec. 2, 2015.
Office Action from Chinese Patent Application No. 201310745983.7, dated Dec. 18, 2015.
Final Office Action from U.S. Appl. No. 13/754,791, dated Jan. 8, 2016.
Notice of Allowance from U.S. Appl. No. 13/763,516, dated Dec. 31, 2015.
Non-Final Office Action from U.S. Appl. No. 13/770,982, dated Jan. 13, 2016.
Advisory Action from U.S. Appl. No. 13/752,289, dated Jan. 25, 2016.
Notice of Allowance from U.S. Appl. No. 13/752,289, dated Mar. 17, 2016.
Notice of Allowance from U.S. Appl. No. 13/770,975, dated Mar. 3, 2016.
Non-Final Office Action from U.S. Appl. No. 13/754,791, dated May 16, 2016.
Notice of Allowance from U.S. Appl. No. 13/763,516, dated May 20, 2016.
Final Office Action from U.S. Appl. No. 13/770,982, dated Jun. 23, 2016.
Non-Final Office Action from U.S. Appl. No. 13/754,791, dated Jan. 12, 2017.
Notice of Allowance from U.S. Appl. No. 13/770,982, dated Feb. 3, 2017.
Final Office Action from U.S. Appl. No. 13/754,791, dated Oct. 6, 2016.
Office Action from Taiwan Application No. 102142875, dated Sep. 21, 2016.
Notice of Allowance from U.S. Appl. No. 13/770,982, dated Sep. 21, 2016.
Office Action from Taiwan Application No. 102147479, dated Oct. 4, 2016.
Advisory Action from U.S. Appl. No. 13/754,791, dated Dec. 13, 2016.
Notice of Allowance from U.S. Appl. No. 13/754,791, dated Apr. 21, 2017.
Notice of Allowance from U.S. Appl. No. 13/754,791, dated Aug. 3, 2017.

\* cited by examiner

US 9,804,621 B2

CURRENT-PARKING SWITCHING REGULATOR DOWNSTREAM CONTROLLER PRE-DRIVER

FIELD OF THE INVENTION

The present invention relates to regulator circuits.

BACKGROUND

Conventional devices such as microprocessors and graphics processors that are used in high-performance digital systems may have varying current demands based on the processing workload. For example, current demands may increase dramatically when a block of logic is restarted after a stall or when a new request initiates a large computation such as the generation of a new image. Conversely, current demands may decrease dramatically when a block of logic becomes idle. When the current demand increases and sufficient power is not available, the supply voltage that is provided to the device may drop below a critical voltage level, potentially causing the device to fail to function properly. When the current demand decreases and the supply voltage that is provided to the device rises above a critical voltage level, circuits within the device may fail to function properly and may even be destroyed.

A conventional multi-phase switching regulator is an electric power conversion device that interfaces between a power supply and a device, providing current to the device and responding to changes in current demands to maintain a supply voltage level. However, a conventional multi-phase switching regulator relies on a large inductor for voltage conversion and the large inductor limits the ability of the conventional multi-phase switching regulator to quickly respond to dramatic changes in current demands (i.e., current transients). A typical 30 A phase of the conventional multi-phase switching regulator may use a 0.5 µH inductor for voltage conversion. The current response is limited to $di/dt=V/L$ which for V=11V (dropping a 12V input to a 1V supply voltage level) and L=0.5 µH gives 22 A/µs. Increasing the current provided to a device by 10 A in would require at least 500 ns. Additionally, synchronization of the pulse width modulation switching operation may increase the current response time of the conventional multi-phase switching regulator by several microseconds. When a clock period of the device is less than the current response time, the device may fail to function properly. A 500 MHz clock has a period of 2 ns, so hundreds of clock periods may occur during a 500 ns current response time.

Thus, there is a need for improving regulation of voltage levels and/or other issues associated with the prior art.

SUMMARY

A system and method are provided for generating non-overlapping enable signals. A peak voltage level is measured at an output of a current source that is configured to provide current to a voltage control mechanism. The non-overlapping enable signals are generated for the voltage control mechanism based on the peak voltage level. A system includes the current source, a downstream controller, and the voltage control mechanism that is coupled to the load. The current source is configured to provide current to the voltage control mechanism. The controller is configured to measure the peak voltage level at the output of the current source and generate the non-overlapping enable signals based on the peak voltage level. The non-overlapping enable signals provide a portion of the current to the load.

DETAILED DESCRIPTION

An electric power conversion device provides a desired output voltage level to a load, such as a device. The electric power conversion device converts power received from a power source (e.g., battery or main power supply) to a supply voltage level that is provided to the load. An inductor is used to deliver additional current to the load and regulate the output voltage level with switching mechanisms modulating the average current that flows through the inductor. A capacitor is coupled between the load and ground to store any excess current (difference between the current provided through the inductor and the current delivered to the load).

Figure 1A:
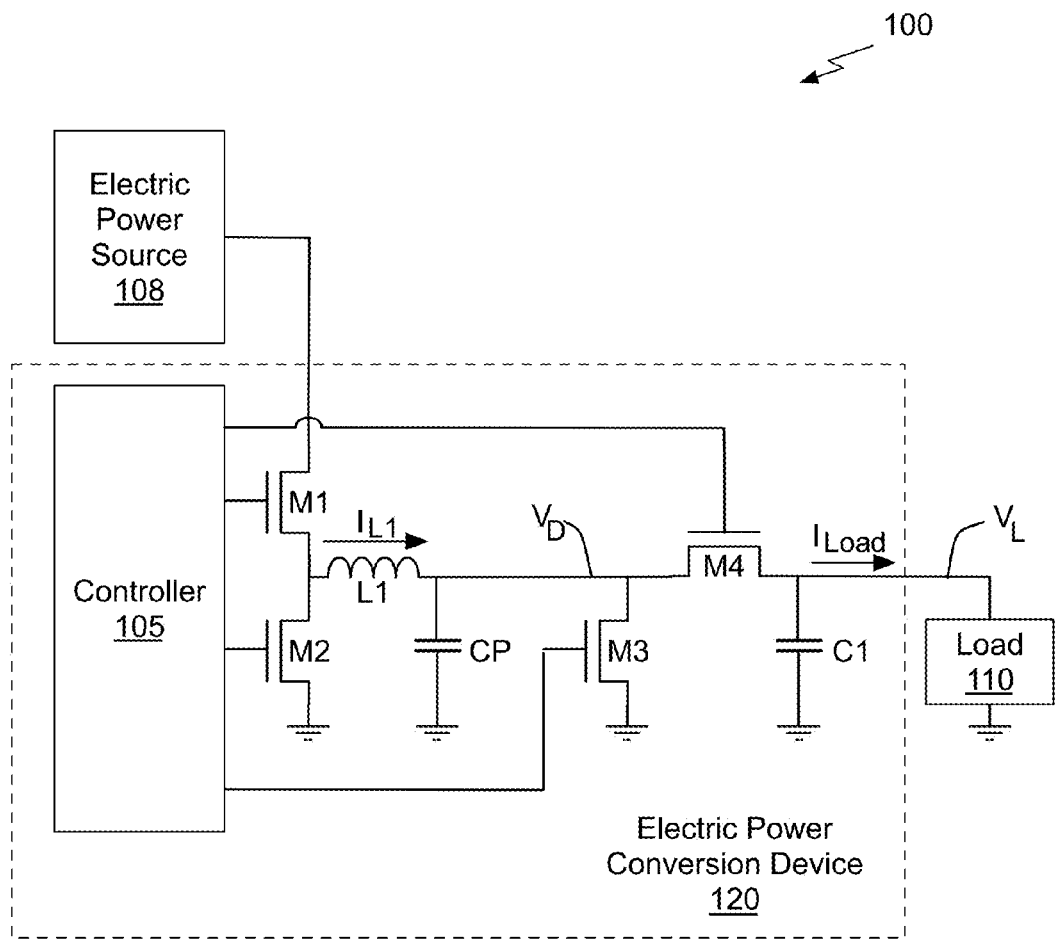
FIG. 1A illustrates an electric power conversion system including an electric power conversion device that is implemented as a current-parking switching regulator with a single inductor, in accordance with one embodiment.
Figure 1B:
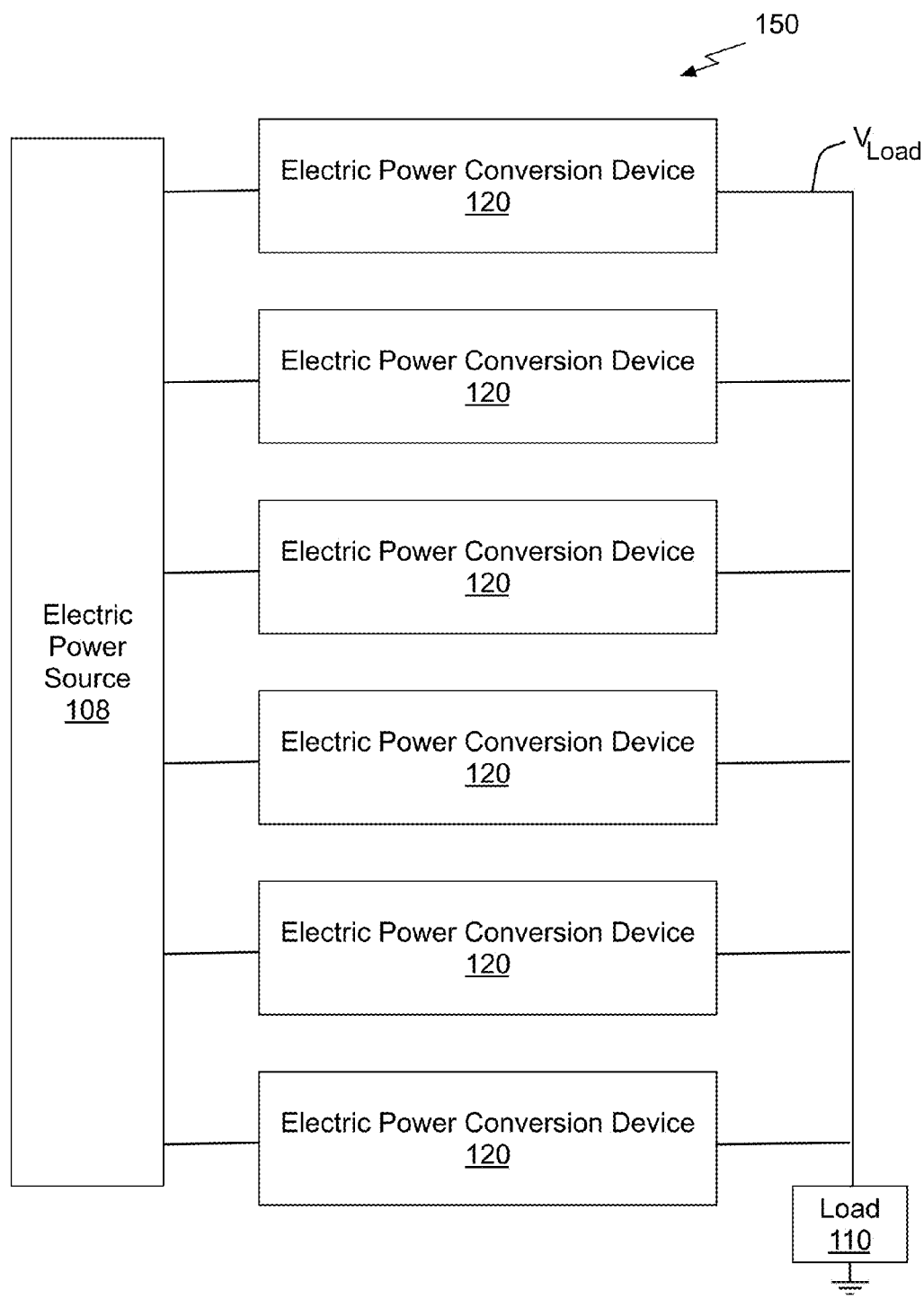
FIG. 1B illustrates a multi-phase switching regulator that includes multiple electric power conversion devices, in accordance with one embodiment.

FIG. 1A illustrates an electric power conversion system 100 including an electric power conversion device 120 that is implemented as a current-parking switching regulator with a single inductor L1, in accordance with one embodiment. The electric power conversion device 120 may be one phase of a multi-phase switching regulator, as shown in FIG. 1B. The electric power conversion device 120 is configured to provide a desired output voltage level ($V_L$) at the load 110 by converting power received from an electric power source 108. The electric power conversion device 120 includes a current control mechanism and a voltage control mechanism. The current control mechanism is coupled to the electric power source 108 and the controller 105 and is operable to control the average of the current $I_{L1}$ flowing through the inductor L1 and ensure a minimum current is provided across the multiple phases of a multi-phase switching regulator. For example, as illustrated, the current control mechanism may include one or more first switching mechanisms M1 and one or more second switching mechanisms M2. The switching mechanisms M1 and M2 may each include, for example, N-type power MOSFETs (metal oxide semiconductor field-effect transistor), and/or other switching mechanisms. Although single switching mechanisms M1 and M2 is illustrated for the ease of understanding, it will be appreciated that a plurality of switching mechanisms M1 and M2 may be connected in parallel to increase current capacity, decrease conduction losses, and the like.

The controller 105 is configured to apply one or more control signals to the switching mechanisms M1 and M2. For example, the controller 105 may be configured to generate pulse width modulation (PWM) signals or pulse frequency modulation (PFM) signals, a combination of PWM and PFM, and/or different control signals to selectively enable the switching mechanisms M1 and M2 according to a duty factor. Regardless of the specific configuration, the controller 105 is configured to provide control signals such that the switching mechanisms M1 and M2 are not concurrently enabled (i.e., turned on). In other words, only one of switching mechanism M1 and M2 is enabled at a time. Enabling switching mechanisms M1 and M2 concurrently provides a direct path between the supply of electric power source 108 and ground, thereby potentially damaging the electric power conversion device 120 and/or the load 110 and/or resulting in undesirable high power usage.

In contrast with conventional electric power conversion devices, the electric power conversion device 120 includes the voltage control mechanism in addition to the current control mechanism. The voltage control mechanism is coupled between the current control mechanism (at the downstream end of the inductor L1) and the load 110 and is operable to control the $V_L$. The current control mechanism is configured to generate current $I_{L1}$ that is "parked" in the inductor L1. The voltage control mechanism is operable to control the amount of the inductor current $I_{L1}$ that is delivered to a capacitor C1. As such, the voltage control mechanism comprises one or more switching mechanisms M3 and one or more switching mechanisms M4. The switching mechanisms M3 and M4 may each include, for example, N-type planar MOSFETs (metal oxide semiconductor field-effect transistor), and/or other switching mechanisms. Although single switching mechanisms M3 and M4 are illustrated for the ease of understanding, it will be appreciated that a plurality of switching mechanisms M3 and M4 may be connected in parallel to increase current capacity, decrease conduction losses, and the like.

A conventional electric power conversion device does not include the switching mechanisms M3 and M4, so the inductor L1 would instead be coupled directly to the capacitor C1 and the load 110. Any excess current that flows through the inductor L1 and is not consumed by the load 110 is accumulated on the capacitor C1 and any current drawn by the load 110 that exceeds the current provided by the inductor L1 is sourced by the capacitor C1. The inductor L1 resists changes in current, thereby preventing the stored energy in the inductor L1 from being released all at once to the load 110 when the current demands of the load 110 increase. This property of inductors, along with the storage capacity of the capacitor C1 enable $V_L$ to be sufficiently stable during steady-state operation (i.e., when the current demand of the load 110 is relatively constant). Nonetheless, there is some "ripple" in $V_L$ that depends on the size of the inductor L1, the size of the capacitor C1, and/or the switching frequency of the controller 105, among other factors. Generally speaking, as the size of the inductor L1 increases, the output ripple during steady state operation (i.e., approximately constant current demand at the load 110) proportionally decreases. Accordingly, the inductor L1 may be sized large enough in order to provide a $V_L$ that does not fluctuate outside a desired supply voltage range for the load 110. However, as previously explained, a conventional electric power conversion device is typically unable to respond to changes in the current needs of the load 110 quickly enough. The large inductance of L1 that is needed to reduce the ripple at $V_L$ increases the response time, producing larger voltage deviations when the current demand of the load 110 varies. The voltage control mechanism that is included in the electric power conversion device 120 enables faster response time to changes in current demand of the load 110 without necessitating decreasing the size of the inductor L1 which may cause the voltage ripple at $V_L$ to increase.

In contrast to the switching mechanisms M1 and M2, the voltage across the switching mechanisms M3 and M4 may be substantially less than the voltage drop across the inductor L1. For example, the voltage supplied at the downstream of the inductor L1 may be substantially equivalent to the output voltage at the load 110. Because the switching mechanisms M3 and M4 are switching a lower voltage, the switching mechanisms M3 and M4 may be constructed from lower-voltage devices, such as "planar" MOS transistors, as compared to the switching mechanisms M1 and M2. Lower-voltage devices can typically be switched at higher frequencies compared with higher-voltage devices, such as power MOSFETs. Therefore, power loss due to switching is reduced for the switching mechanisms M3 and M4 compared with the switching mechanisms M1 and M2. Hence switching mechanisms M3 and M4 can be switched at a substantially higher frequency than switching mechanisms M1 and M2.

Switching mechanisms M3 and M4 may be incorporated into an integrated circuit, thereby potentially reducing space used and/or reducing cost compared with using discrete components. For example, the switching mechanisms M3 and M4 may be realized on the same integrated circuit as the load 110, may be integrated on a separate die on the same package as the load 110, or may be integrated on a separate package. The switching mechanisms M3 and M4 may be realized as standard-voltage "core" transistors in a typical digital integrated-circuit process, or the switching mechanisms M3 and M4 may be realized as higher-voltage thick-oxide input-output transistors in a typical integrated-circuit process. In a preferred embodiment, the switching mechanism M4 is a P-type planar MOSFET and the switching mechanism M3 is an N-type planar MOSFET. However, one of ordinary skill in the art will understand that either type of MOSFET may be used for either switching mechanism with appropriate gate-drive circuitry without departing from the scope of the present disclosure.

The controller 105 may be further configured to apply one or more control signals to the voltage control mechanism. For example, the controller 105 may be configured to provide control signals to the switching mechanisms M3 and M4. As with the control signals provided to the switching mechanisms M1 and M2, the control signals that are provided to the switching mechanisms M3 and M4 may utilize PWM, PFM, bang-bang control, and/or any other suitable control schema in order to selectively enable the switching mechanism M3 or the switching mechanism M4. In some embodiments the control signals coupled to the switching mechanisms M3 and M4 may be at least partially synchronous with the control signals coupled to the switching mechanisms M1 and M2. In other embodiments, the control signals coupled to the switching mechanisms M3 and M4 may be asynchronous with the control signals coupled to the switching mechanisms M1 and M2. Furthermore, the control signals coupled to the switching mechanisms M3 and M4 may be provided at a different frequency than the control signals that are coupled to the switching mechanisms M1 and M2.

Regardless of the specific configuration of the control signals that are coupled to the switching mechanisms M3 and M4, the controller 105 may be configured to selectively enable the switching mechanism M3 and disable the switching mechanism M4 to disable the flow of current $I_{L1}$ to the load 110. Specifically, by enabling the switching mechanism M3 and disabling the switching mechanism M4, the instantaneous inductor current $I_{L1}$ flowing through the inductor L1 is diverted through the switching mechanism M3 to ground instead of being delivered to the capacitor C1. Conversely, by enabling the switching mechanism M4 and disabling the switching mechanism M3, substantially all of the instantaneous inductor current $I_{L1}$ flowing through the inductor L1 (less transistor conduction losses, inductor winding resistance, and the like) is provided to the capacitor C1.

The controller 105 may use PWM or PFM to switch the voltage control mechanism or may use a bang-bang technique. In either case, the duty factor (DF) determines the portion of the inductor current $I_{L1}$ that on average is supplied to the capacitor C1. The duty factor may range from 0-100%, where 0% corresponds to the state where the switching mechanism M4 is disabled (i.e., turned off) and the switching mechanism M3 is enabled and a 100% corresponds to the state where the switching mechanism M4 is enabled and the switching mechanism M3 is disabled. Changing the duty factor thereby changes the charge/discharge timing of the capacitor C1—a higher duty factor increases the current flow to the capacitor C1 and the load 110.

The capacitor C1 smoothes the square wave supply current provided through the switching mechanism M4 to generate $I_{Load}$ that is provided to the load 110. The $I_{Load}$ is provided to the load 110 according to the duty factor and the inductor current $I_{L1}$, as follows: $I_{Load}=DF \times I_{L1}$. As with the switching mechanisms M1 and M2, control signals are provided to the switching mechanisms M3 and M4 such that the switching mechanisms M3 and M4 are not concurrently enabled to avoid providing a direct path between the load 110 and ground (i.e., a short circuit across the capacitor C1).

During steady-state operation, the switching mechanism M3 is disabled and the switching mechanism M4 is enabled, such that substantially all of the inductor current $I_{L1}$ is provided to the load 110 as $I_{Load}$. The switching mechanisms M1 and M2 are selectively enabled ("switched") in order to control the inductor current $I_{L1}$, thereby controlling $V_L$. In this manner, if the voltage provided to the load 110 ($V_L$) is constant, the current provided through the switching mechanism M4 is substantially equivalent to the inductor current $I_{L1}$.

In sum, the current control mechanism is configured to generate current $I_{L1}$ that is parked in the inductor L1 and metered out to the load 110 by the voltage control mechanism. Because the voltage levels applied to the switching mechanisms M3 and M4 are low (i.e., the supply voltage of the load 110), the switching mechanisms M3 and M4 may be implemented as fast, inexpensive planar transistors and can be operated at very high frequency (e.g., 300 MHz) allowing very rapid response to current transients at the load 110. When the current demand at the load 110 changes (i.e., not steady-state operation), the switching mechanisms M3 and M4 of the voltage control mechanism may be controlled to quickly respond to the change in current demand by increasing or decreasing the amount of the current $I_{L1}$ this is metered out to the load 110. In general, the switching frequency of the current control mechanism is slower than the switching frequency of the voltage control mechanism due to the different types of switching mechanisms that are used.

A lumped element CP in the electric power conversion device 120 represents the parasitic capacitance on the downstream side of the inductor L1. Each time the switching mechanisms M3 and M4 are switched, the parasitic capacitance CP is charged to the load voltage $V_L$ (when the switching mechanism M4 is enabled) and then discharged to ground (when the switching mechanism M3 is enabled). Thus, each switching cycle of the switching mechanisms M3 and M4 an energy $E_P$ of $$E_P=(CP)V_L^2$$

is dissipated by charging and discharging the parasitic capacitance CP.

In a typical embodiment of the electric power conversion device 120, the inductor L1 is a surface mount 0.5 uH 30 A inductor, the switching mechanisms M3 and M4 are located on the package, and the capacitor C1 is on-chip and on-package bypass capacitance. Capacitor CP includes the capacitance of the vias, board traces, and package traces between the inductor L1 and the switching mechanisms M3 and M4. In a typical application the capacitance CP may total as much as 500 pF. If CP=500 pF and $V_L$=1V, then $E_P$ is 500 pJ. At a switching frequency of 300 MHz, 150 mW is dissipated charging and discharging CP. When the current control mechanism and the voltage control mechanism of the electric power conversion device 120 are configured as one of a plurality of phases of a regulator, $E_P$ is scaled by the number of phases for the total energy that is dissipated due to the cumulative parasitic capacitance.

This switching power increases as the switching frequency ($f_s$) of the switching mechanisms M3 and M4 is increased. One would like to switch the switching mechanisms M3 and M4 at a high frequency to minimize the required size of C1 that is given by $$C_1 = \frac{I_{L1}(1-DF)}{f_S V_R}$$

where DF is the duty factor of the switching mechanism M4 and $V_R$ is a ripple voltage of $V_L$.

For example with a phase current of 30 A, a frequency of 300 MHz, and a ripple voltage of 20 mV the required capacitance C1 is 5 uF per phase. C1 is typically distributed across many smaller capacitors on the package to give low series inductance and to provide a flat impedance as a function of the switching frequency. Increasing the switching frequency reduces the required size of C1 but at the expense of increased switching power $E_P$.

An advantage of a current-parking switching regulator, such as the electric power conversion device 120, is that C1 is the only filter capacitance needed. In comparison, a conventional electric power conversion device that does not include the switching mechanisms M3 and M4 relies on a large (hundreds of µF) filter capacitance to filter the low frequency (typically 300 kHz) ripple.

The configuration of the electric power source 108, the controller 105, the switching devices M1 and M2, and the inductor L1 shown in FIG. 1A is typically referred to as a "buck" converter. While the electric power conversion device 120 is described in the context of this buck converter, one of ordinary skill in the art will understand that the techniques described to regulate a voltage provided to the load 110 can be applied to other "switch-mode" power conversion circuits including, but not limited to, a forward converter, a half-bridge converter, a full-bridge converter, a flyback converter, and/or variants thereof.

FIG. 1B illustrates a multi-phase switching regulator 150 that includes electric power conversion devices 120, in accordance with one embodiment. Each of the electric power conversion devices 120 is one phase of a six-phase switching regulator. Each electric power conversion device 120 is configured to provide a desired output voltage level ($V_L$) at the load 110 by converting power received from an electric power source 108 for one phase of the six phases. A single controller may be used to control each of the electric power conversion devices 120 or each electric power conversion device 120 may include a dedicated controller 105 (as shown in FIG. 1B). A single filter capacitor C1 may be shared by the different electric power conversion devices 120 rather than including a filter capacitor C1 in each of the electric power conversion devices 120. Additionally, one or more of the electric power conversion devices 120 may be replaced with a current-parking switching regulator with a split inductor or a conventional electric power conversion device.

Figure 1C:
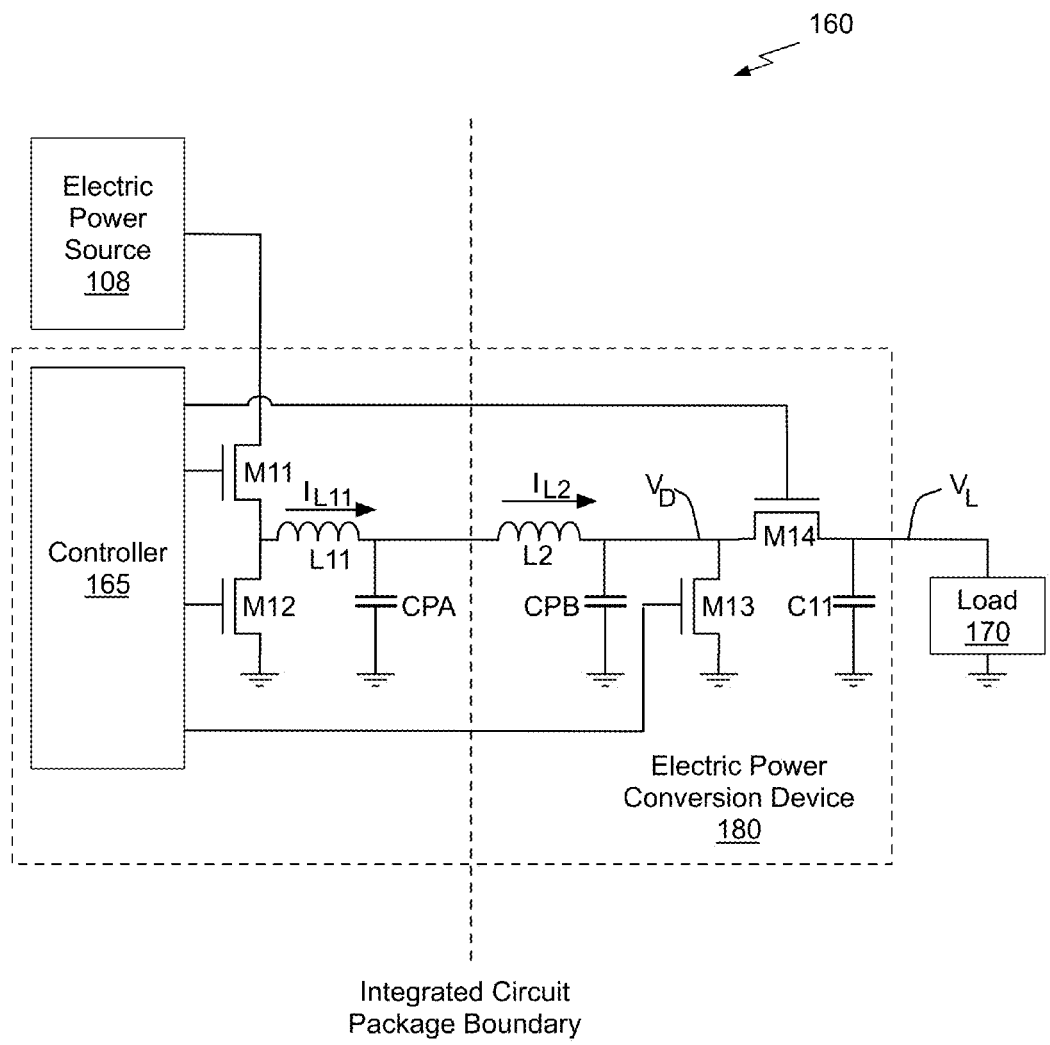
FIG. 1C illustrates a current-parking switching regulator with a split inductor, in accordance with one embodiment.

FIG. 1C illustrates an electric power conversion system 160 including an electric power conversion device 180 that is implemented as a current-parking switching regulator with a split inductor, in accordance with one embodiment. Compared with the electric power conversion device 120 shown in FIG. 1A, the electric power conversion device 180 includes a first inductor L11 that is coupled in series with a second inductor L2 to form a split inductor. Splitting the inductor reduces losses due to parasitic capacitance CPA on the downstream side of the first inductor L11.

The electric power conversion device 180 may be one phase of a multi-phase switching regulator. The electric power conversion device 180 is configured to provide a desired output voltage level ($V_L$) at the load 170 by converting power received from an electric power source 108. The electric power conversion device 180 includes a current control mechanism and a voltage control mechanism. The current control mechanism is coupled to the electric power source 108 and the controller 165 may be configured to generate control signals in the same manner as the controller 105 and is operable to control the average of the current $I_{L11}$ flowing through the inductor L11 and the current $I_{L2}$ flowing through the inductor L2. For example, as illustrated, the switching mechanisms M11 and M12 are configured and operable in the same manner as previously described switching mechanisms M1 and M2, respectively. Similarly, the switching mechanisms M13 and M14 are configured and operable in the same manner as previously described switching mechanisms M3 and M4, respectively. The capacitor C11 performs substantially the same function as the capacitor C1.

Using two different inductors L11 and L2 to form a split inductor reduces the switching energy so that the bulk of the parasitic capacitance falls between the inductor L11 and L2, shown as a first parasitic capacitance CPA. In one embodiment, L11 is a 0.5 µH 30 A first inductor on a printed circuit board (e.g., a discrete component) and the second inductor L2 is a 1 nH inductor in the package that encloses the load 170. The first parasitic capacitance CPA includes the capacitance of the vias, board traces, and package traces between the first inductor L11 and the second inductor L2. The first parasitic capacitance CPA may be approximately 490 pF. The second parasitic capacitance CPB consists primarily of the drain capacitance of the switching mechanisms M13 and M14 and may be approximately 10 pF. If CPB=10 pF and $V_L$=1V, then $E_P$ is 10 pJ and, at a switching frequency of 500 MHz, 5 mW is dissipated charging and discharging CPB.

The switching frequency of 500 MHz, allows use of a 0.5 pF capacitor (implemented as a distributed array of smaller capacitors in some embodiments) for the capacitor C11. The 1 nH inductance of the second inductor L2 can be formed by integrating a ferrite bead around the traces or bumps carrying the current $I_{L2}$ or by simply running a trace a suitable distance from the ground return (making the second inductor L2 a planar air-core inductor). The resonant frequency of the tank circuit formed by L2 and the first parasitic capacitance CPA is $f_r$=230 MHz. Thus, as long as the switching frequency of the switching mechanisms M13 and M14 is high compared to $f_r$, the capacitance of the first parasitic capacitance CPA is effectively isolated from the switching node $V_L$. Because the first parasitic capacitance CPA is located between the first inductor L11 and the second inductor L2, CPA is isolated and is lossless. Any excess current is stored in the split inductor formed by the first inductor L11 and the second inductor L2.

Figure 2:
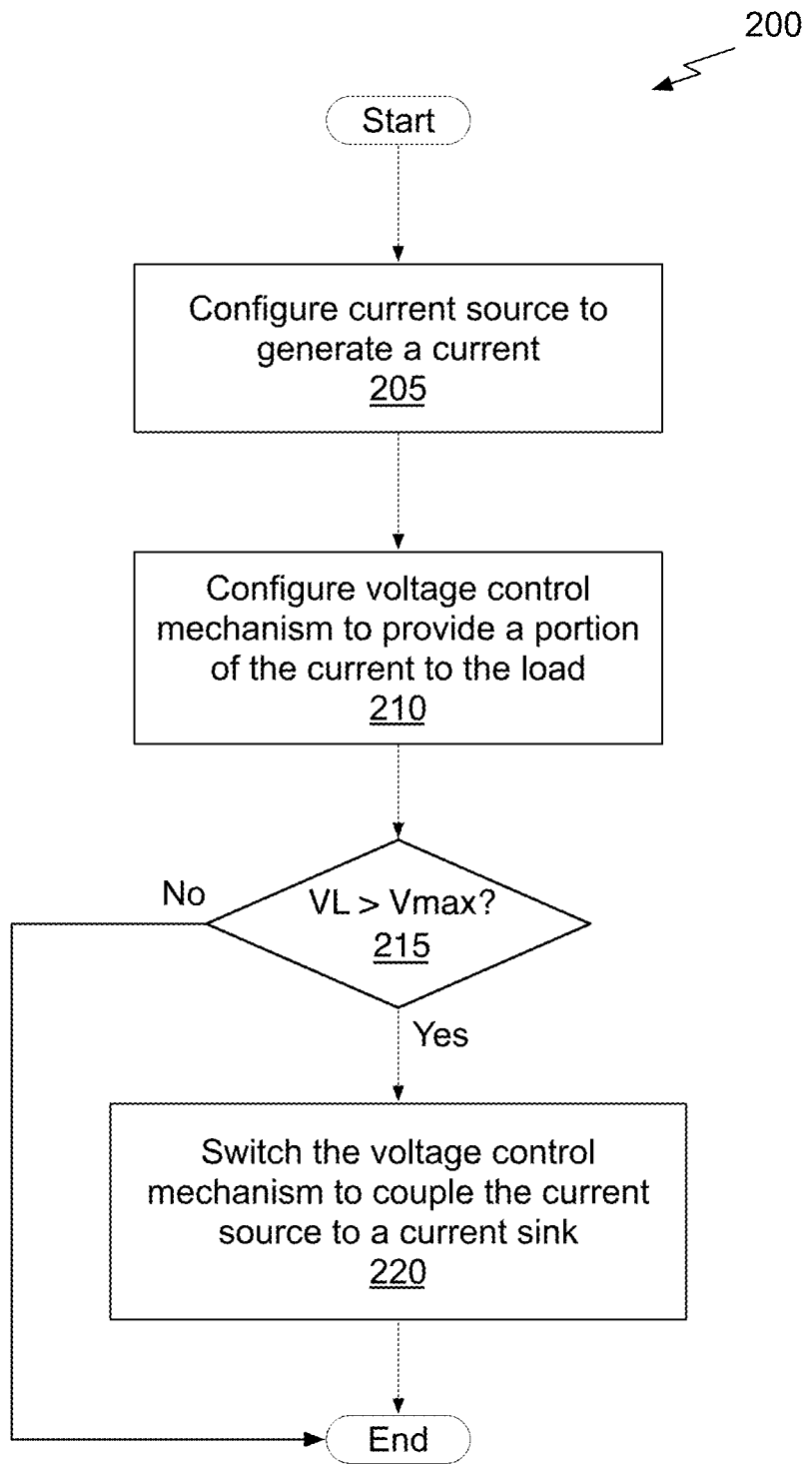
FIG. 2 illustrates a flowchart of a method for regulating the voltage level provided to a load, in accordance with one embodiment.

FIG. 2 illustrates a flowchart 200 of a method for regulating the voltage level provided to the load 110 or 170, in accordance with one embodiment. At step 205, a current source is configured to generate a current. At step 210, a voltage control mechanism is configured to provide a portion of the current to the load to regulate the voltage level at the load. At step 215, if the voltage level at the load 110 or 170 is not greater than a maximum voltage level, the regulation of the voltage level provided to the load is complete. Otherwise, at step 220, the voltage control mechanism is switched to decouple the current source from the load 110 or 170 and to couple the current source to a current sink to reduce the voltage level at the load. In one embodiment, the current source is at least the inductor L1 or L11 and the current sink is ground.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
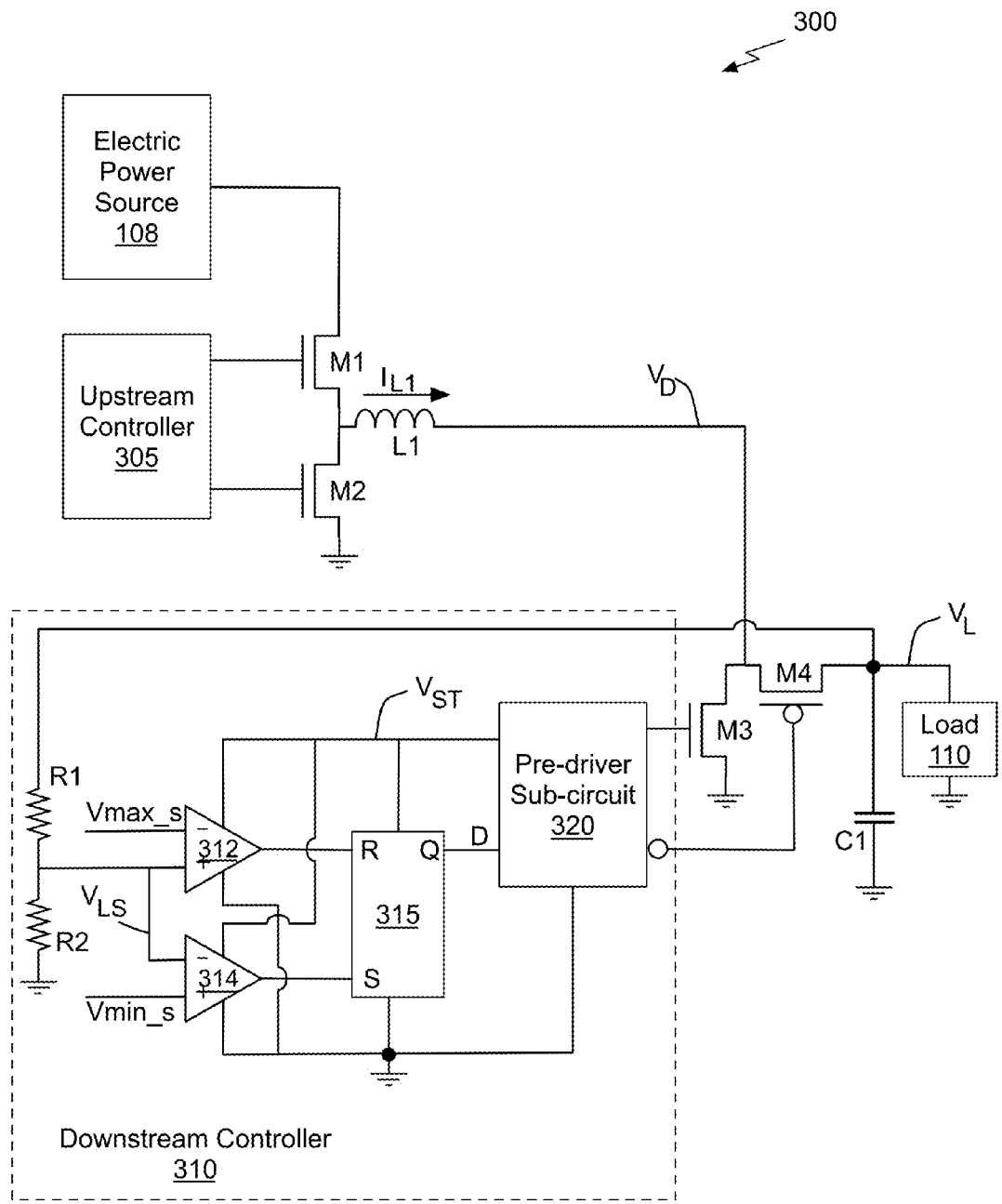
FIG. 3A illustrates a downstream controller portion of a current-parking switching regulator, in accordance with one embodiment.

FIG. 3A illustrates a downstream controller 310 of a current-parking switching regulator within an electric power conversion system 300, in accordance with one embodiment. The downstream controller 310 is a bang-bang control circuit that is configured to hold the voltage level at the load 110, $V_L$, within a specified voltage range between a minimum voltage level (Vmin) and a maximum voltage level (Vmax). For example, when the nominal voltage level of $V_L$ is 1 volt and a 20 mV ripple is specified, Vmin is specified as 0.99V and Vmax is specified as 1.01V.

As shown, in FIG. 3A, in one embodiment the downstream controller 310 includes a voltage divider comprising the resistors R1 and R2 that are configured to produce a scaled version of $V_L$, scaled voltage $V_{LS}$. The downstream controller 310 also includes the comparators 312 and 314, a set-reset flip-flop 315, and a pre-driver sub-circuit 320. The scaled voltage $V_{LS}=KV_L$ and is within the common-mode range of the comparators 312 and 314. In one embodiment, K=0.5 so that $V_{LS}=0.5V_L$. The comparator 312 compares $V_{LS}$ to a scaled version of Vmax, Vmax_s=KVmax and the comparator 314 compares $V_{LS}$ to a scaled version of Vmin, Vmin_s=KVmin. When $V_{LS}$ is less than Vmin_s, the output of the comparator 314 goes high (TRUE) and the S (set) input to the set-reset flip-flop 315 is asserted, so the Q output that generates the D signal is high (TRUE). When $V_{LS}$ is greater than Vmax_s, the output of the comparator 312 goes high (TRUE) and the R (reset) input to the set-reset flip-flop 315 is asserted, so the Q output that generates the D signal is low (FALSE).

The pre-driver sub-circuit 320 is configured to generate signals coupled to the gates of the switching mechanisms M3 and M4 that enable and disable the switching mechanisms M3 and M4. When D is high, the switching mechanism M4 is enabled and the switching mechanism M3 is disabled. When D is low, the switching mechanism M3 is enabled and the switching mechanism M4 is disabled. When the switching mechanism M3 is enabled, the current source (i.e., inductor L1) is coupled to the current sink (i.e., ground) and when the switching mechanism M3 is disabled the current source is decoupled or isolated from the current sink. When the switching mechanism M4 is enabled, the current source is coupled to the load 110 and when the switching mechanism M4 is disabled the current source is decoupled or isolated from the load 110.

As shown in FIG. 3A, in one embodiment the switching mechanism M3 is a N-type planar MOS transistor and the switching mechanism M4 is a P-type planar MOS transistor. The signals generated by the pre-driver sub-circuit 320 are configured to prevent overlap current and overvoltage on the drains of the switching mechanisms M3 and M4. Specifically, only one of the switching mechanisms M3 and M4 is enabled at a time.

The switching mechanism M3 is disabled before the switching mechanism M4 is enabled to ensure a "dead-time" when both switching mechanisms M3 and M4 are disabled. The parasitic capacitance of the drains of the switching mechanisms M3 and M4 is charged by the current $I_{L1}$ during the dead-time and the switching mechanism M4 is enabled when the voltage across the parasitic capacitance reaches $V_L$, so that current does not flow from the load 110 to the inductor L1. The dead-time between when the switching mechanism M3 is disabled and the switching mechanism M4 is enabled is controlled to allow the inductor L1 to charge the drain of the switching mechanism M4 to $V_L$ before the switching mechanism M4 is enabled. The dead-time also ensures that switching mechanism M3 is disabled when the switching mechanism M4 is enabled to avoid shoot-through current from the load 110 through the switching mechanisms M4 and M3 to ground.

Similarly the dead-time between when the switching mechanism M4 is disabled and the switching mechanism M3 is enabled is controlled to keep the drain of the switching mechanism M4 from being charged too high by $I_{L1}$ before the switching mechanism M3 is enabled. The dead-time between when the switching mechanism M4 is disabled and the switching mechanism M3 is enabled also ensures that switching mechanism M4 is disabled when the switching mechanism M3 is enabled to avoid shoot-through current from the load 110 through the switching mechanisms M4 and M3 to ground. The generation of non-overlapping enable signals that control the switching mechanisms M3 and M4 are described in conjunction with FIGS. 4A-4E.

When power is initially applied to the power conversion system 300, $V_L$ is zero and many nanoseconds are needed to charge the capacitor C1 to a voltage between Vmin and Vmax. The downstream controller circuit 310 may be configured to operate using an auxiliary supply voltage $V_{ST}$ that is turned on at startup, before the upstream controller 305 begins to generate the current $I_{L1}$. The switching mechanism M4 is enabled to charge C1 when the current source starts up. In one embodiment, the auxiliary supply voltage is not used for the downstream controller 310 and the downstream controller 310 is configured to disable the switching mechanism M3 and enable the switching mechanism M4 until $V_L$ reaches Vmax.

Figure 3B:
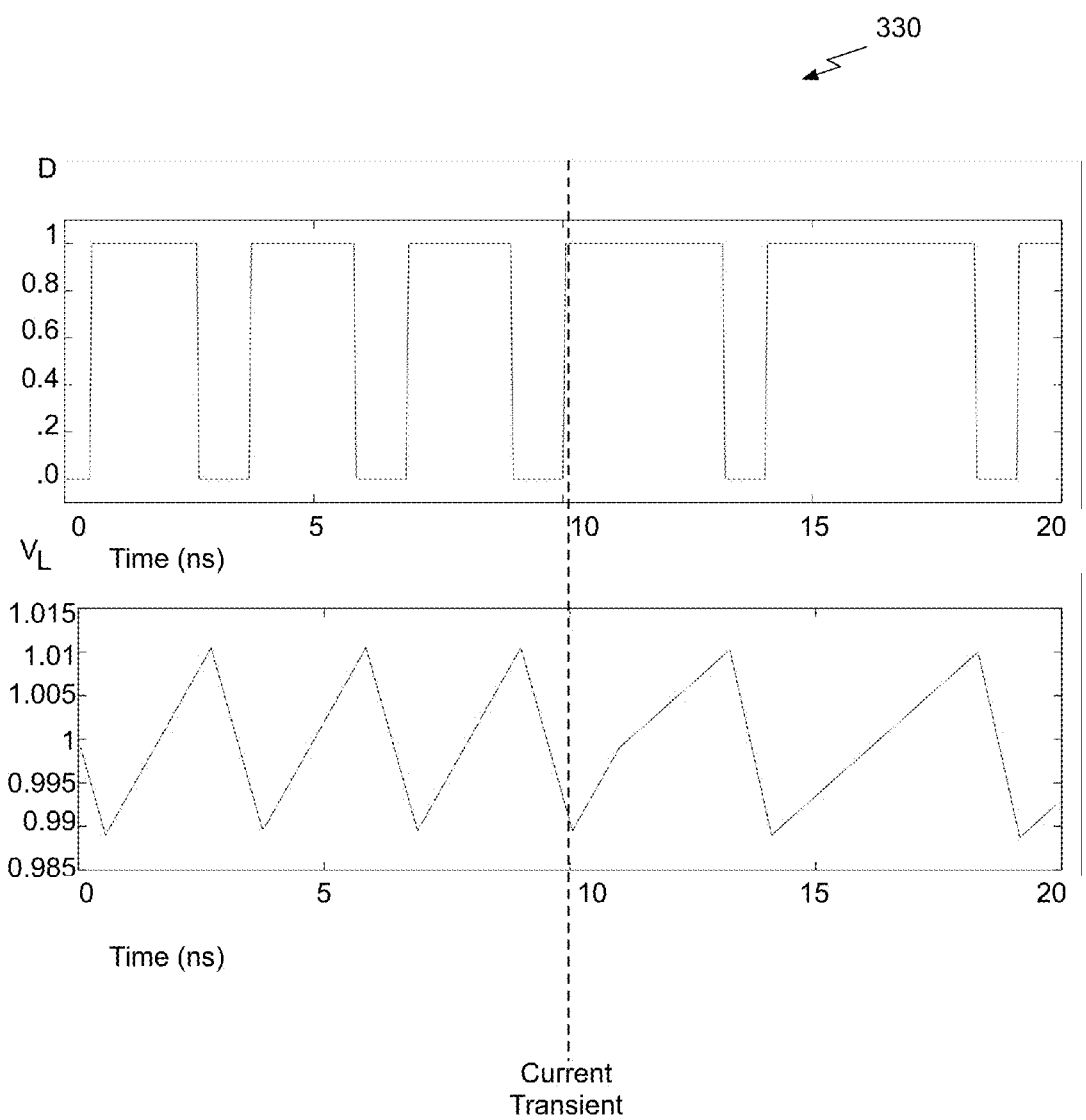
FIG. 3B illustrates waveforms corresponding to the current-parking switching regulator using the downstream controller shown in FIG. 3A, in accordance with one embodiment.

FIG. 3B illustrates waveforms 330 corresponding to the current-parking switching regulator using the downstream controller 310 shown in FIG. 3A, in accordance with one embodiment. The top waveform is the signal D, the output of the set-reset flip-flop 415 shown in FIG. 3A, and the bottom waveform is $V_L$. The bottom waveform is a saw-tooth bounded between Vmin (0.99V) and Vmax (1.01V). The slope of the downward ramps of $V_L$ is given by $I_L/C1$, while the slope of the upward ramps of $V_L$ is given by $(I_{L1}-I_L)/C1$, where $I_L$ is the current provided to the load 110. The frequency of the saw-tooth varies as the current demand of the load 110 varies and as the current $I_{L1}$ varies.

The frequency is at a maximum when the portion of the current $I_{L1}$ that is provided to the load 110 (i.e., the load current $I_L$) is high (corresponding to a steep downward slope of $V_L$), but when $I_L$ is also a small fraction of $I_{L1}$ (corresponding to a steep upward slope). The frequency is low, resulting in lower power loss due to switching, when $I_L$ is low and when $I_L$ is also a high fraction of $I_{L1}$.

The waveforms 330 correspond to a current $I_{L1}$ of 30 A and a current $I_L$ of 20 A for the first 10 ns. At 10 ns the load current $I_L$ is abruptly changed from 20 A to 25 A. During the first 10 ns the downstream controller 310 generates the signal D having a period of approximately 3 ns with D asserted for 2 ns and negated for 1 ns. After the first 10 ns, the period increases to approximately 5 ns with D asserted for 4 ns and negated for 1 ns.

Figure 3C:
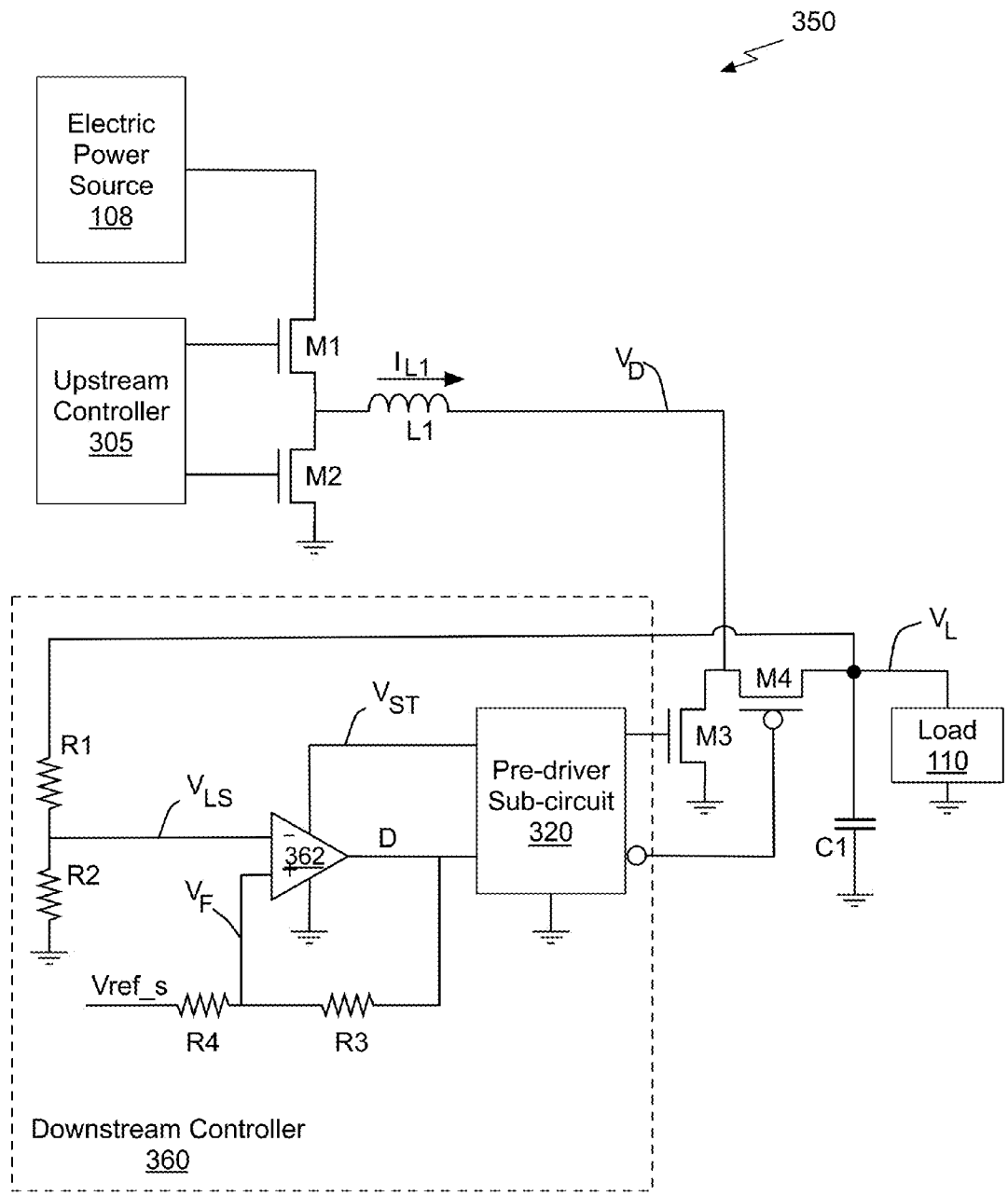
FIG. 3C illustrates another downstream controller portion of a current-parking switching regulator, in accordance with one embodiment.

FIG. 3C illustrates another a downstream controller 360 of a current-parking switching regulator within an electric power conversion system 350, in accordance with one embodiment. Like the downstream controller 310, the downstream controller 360 is a bang-bang control circuit that is configured to hold the voltage level at the load 110, $V_L$, within a specified voltage range between Vmin and Vmax.

As shown, in FIG. 3C, in one embodiment the downstream controller 360 includes a voltage divider comprising the resistors R1 and R2 that are configured to produce a scaled version of $V_L$, scaled voltage $V_{LS}$. The downstream controller 360 includes a single comparator 362 and the pre-driver sub-circuit 320. A scaled reference voltage, Vref_s, is centered within a range bounded by Vmin_s and Vmax_s. The downstream controller 360 includes a feedback circuit comprising the resistors R3 and R4 that are configured to provide positive feedback to the comparator 362 by coupling the output D to the feedback circuit to vary the input, $V_F$, to the comparator 362. The comparator 362 compares $V_{LS}$ to $V_F$, producing hysteresis in the signal D. When $V_{LS}$ is less than $V_F$, signal D, the output of the comparator 362, goes high (TRUE). When $V_{LS}$ is greater than $V_F$, signal D, the output of the comparator 362, goes low (FALSE). The voltage generated at the non-inverting input of the comparator 362 varies in response to changes in the voltage level of D. The resistors R3 and R4 set the hysteresis of the comparator 362 so that the voltage at the positive input of the comparator 362 (i.e., $V_F$) is equal to Vmin_s when D is low and equal to Vmax_s when D is high. Thus, R3 and R4 set the ripple of the voltage control mechanism.

Figure 4A:
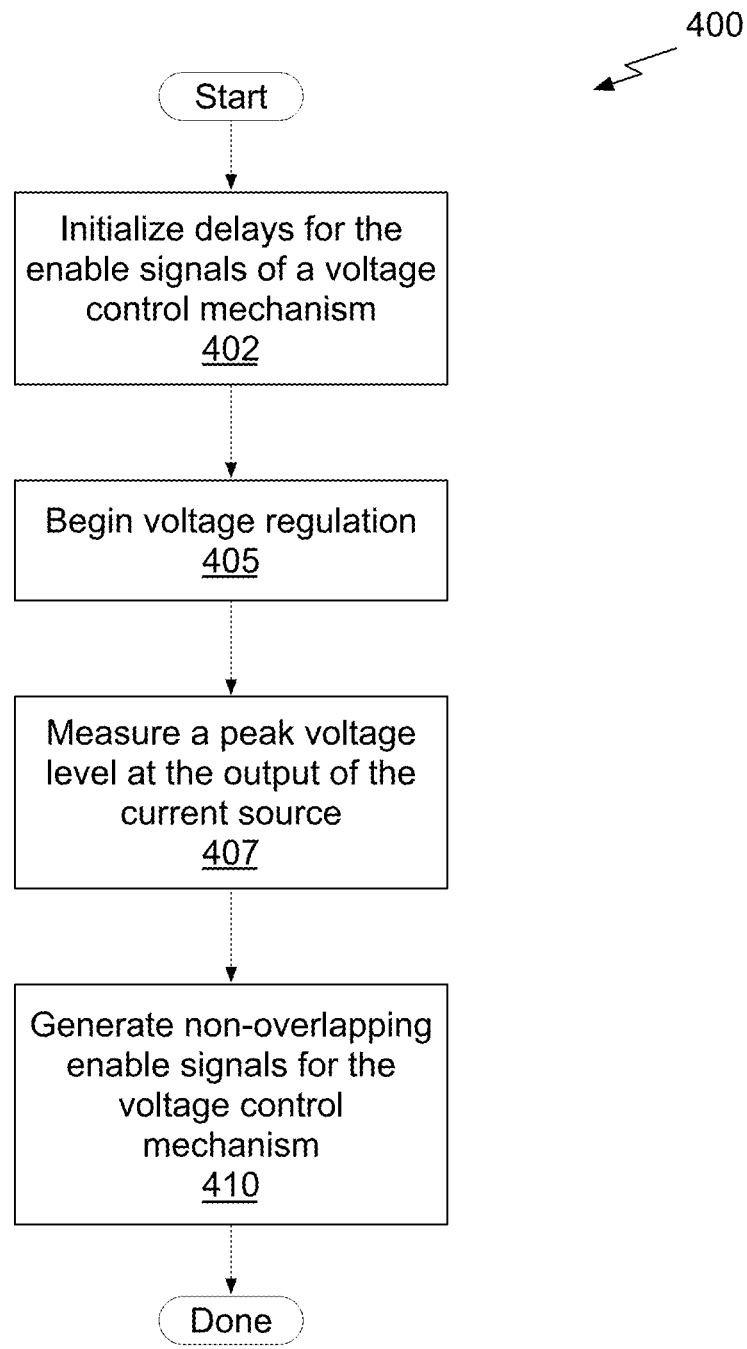
FIG. 4A illustrates a flowchart of a method for generating non-overlapping enable signals by a downstream controller, in accordance with one embodiment.

FIG. 4A illustrates a flowchart 400 of a method for generating non-overlapping enable signals by the pre-driver sub-circuit 320 within the downstream controller 310 or 360, in accordance with one embodiment. At step 402, the pre-driver sub-circuit 320 initializes delays for non-overlapping enable signals that control the switching mechanisms M3 and M4 of the voltage control mechanism.

Separate delays may be used for a first signal that enables the switching mechanism M3 and a second signal the enables the switching mechanism M4. Furthermore, a different delay may be used for a rising transition than is used for a falling transition of the first and/or the second signal. The delays control the duration of the dead-times when both switching mechanisms M3 and M4 are disabled (i.e., when the inverted first signal and the second signal are negated) and the current source is decoupled from the load and decoupled from the current sink. The duration of an "enabling" dead-time between when the switching mechanism M3 is disabled and the switching mechanism M4 is enabled may differ from the duration of a "disabling" dead-time between when the switching mechanism M4 is disabled and the switching mechanism M3 is enabled. In one embodiment, the delays may be initialized to conservative values to avoid shoot-through current from the load 110 through the switching mechanisms M4 and M3 to ground while also minimizing the dead-times. In one embodiment, a conservative setting is the minimum delay that ensures that the gate of the switching mechanism M3 goes low (disabling M3) before the gate of the switching mechanisms M4 goes low (enabling M4) and that ensures that the gate of the switching mechanisms M4 goes high (disabling M4) before the gate of the switching mechanism M3 goes high (enabling M3).

At step 405, the downstream controller 310 or 360 begins regulating $V_L$. At step 407, the pre-driver sub-circuit 320 measures a peak voltage level of $V_D$ at the output of the current source (i.e., the downstream end of the inductor L1). At step 410, the pre-driver sub-circuit 320 generates the non-overlapping enable signals based on the peak voltage level. The non-overlapping enable signals may be generated to increase an enabling and/or disabling dead-time, decrease an enabling and/or disabling dead-time, or maintain an enabling and/or disabling dead-time.

Figure 4B:
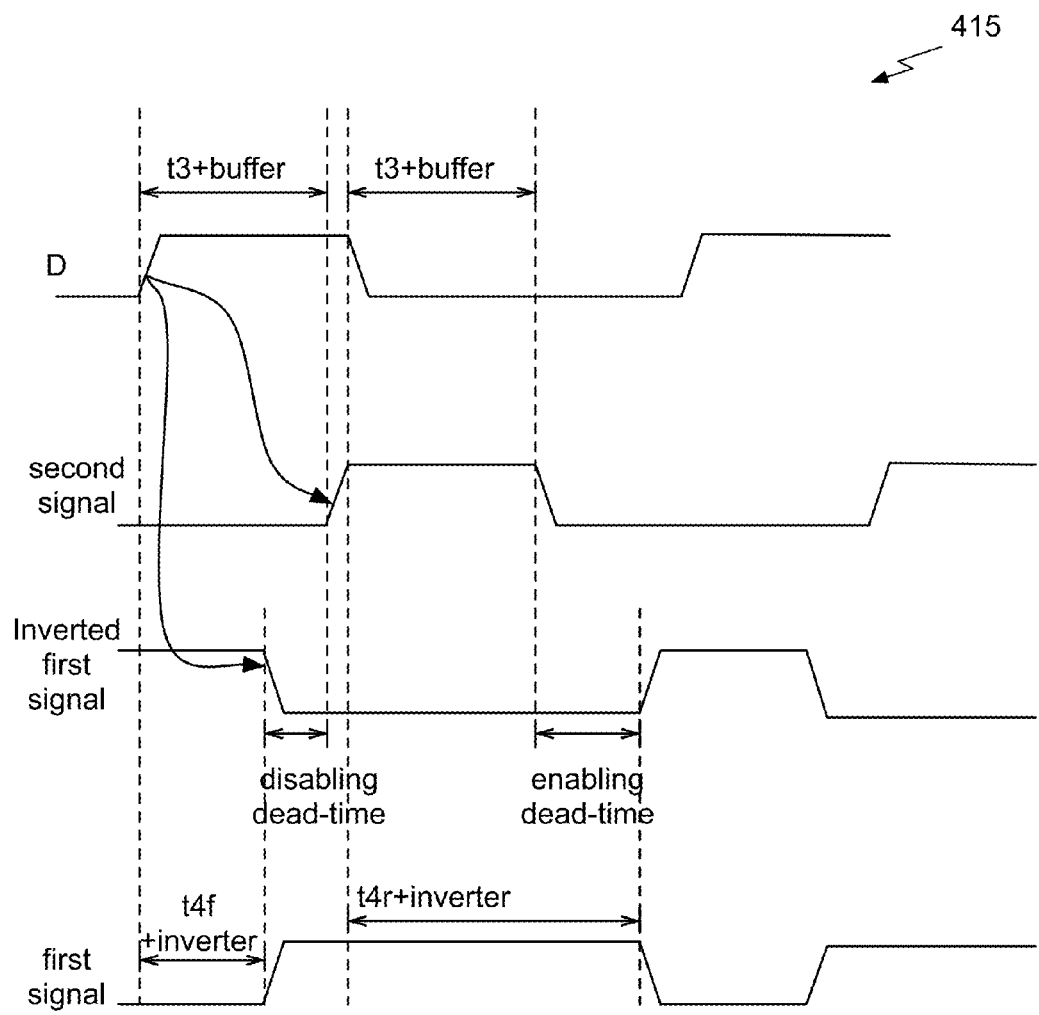
FIG. 4B illustrates waveforms corresponding to the non-overlapping enable signals generated by a downstream controller, in accordance with one embodiment.

FIG. 4B illustrates waveforms 415 corresponding to the non-overlapping enable signals generated by the pre-driver sub-circuit 320 within the downstream controller 310 or 360, in accordance with one embodiment. In one embodiment, the non-overlapping enable signals comprise a first signal and a second signal. The first signal controls (i.e., enables and disables) the switching mechanism M4 and the second signal controls the switching mechanism M3. When the switching mechanism M4 is a P-type MOS transistor, an inverted version of the first signal is coupled to the gate of the P-type MOS transistor. For the purposes of understanding the waveforms 415 shown in FIG. 4B, when the inverted version of the first signal is shown. The inverted version of the first signal is high the switching mechanism M4 is enabled and when the inverted version of the first signal is low, the switching mechanism M4 is disabled. Similarly, when the second signal is high the switching mechanism M3 is enabled and when the second signal is low, the switching mechanism M3 is disabled.

Figure 4C:
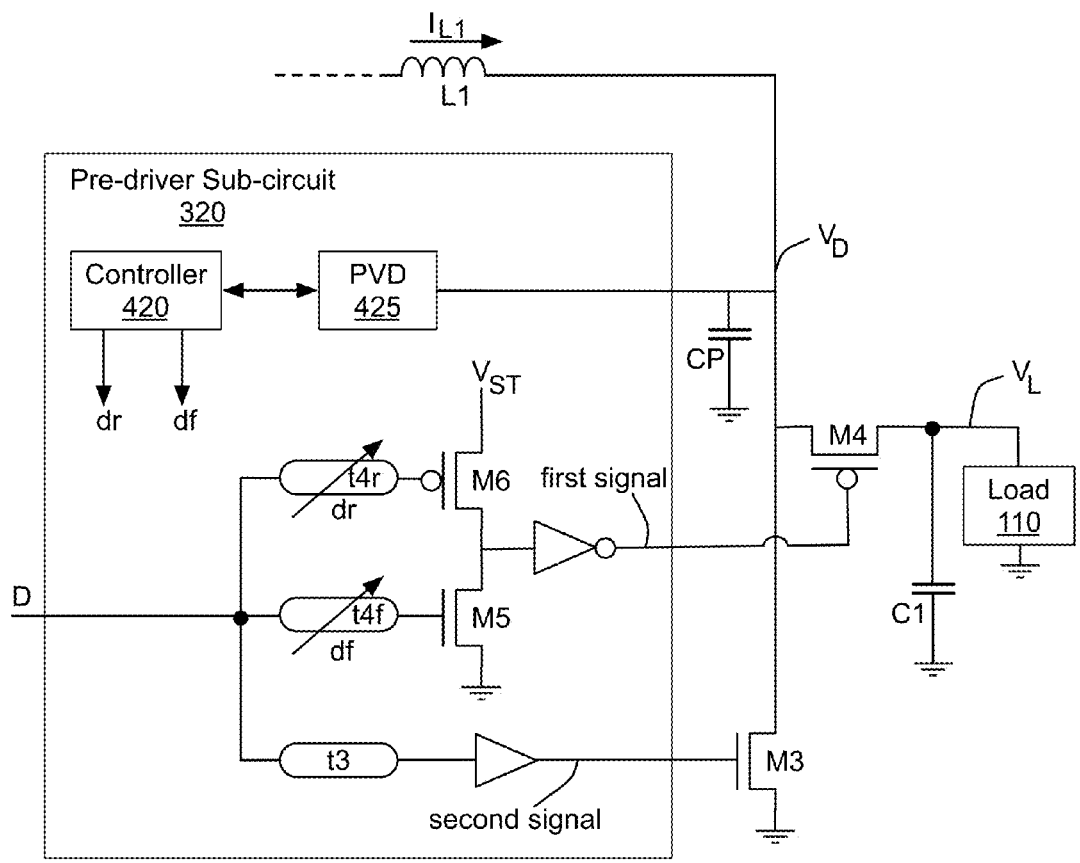
FIG. 4C illustrates a pre-driver sub-circuit of a downstream controller, in accordance with one embodiment.

As shown in FIG. 4B, the D input signal to the pre-driver sub-circuit 320 is delayed by t3 and passed through a buffer (as shown in FIG. 4C) to generate the second signal of the non-overlapping enable signals. A rising transition of the D input signal to the pre-driver sub-circuit 320 is delayed by t4f and causes a falling transition at the input of an inverter (as shown in FIG. 4C). The falling transition causes a rising (i.e., disabling) transition of the first signal of the non-overlapping enable signals (corresponding to a falling transition of the inverted first signal shown in FIG. 4B). The rising transition of the first signal disables the switching mechanism M4. A falling transition of the D input signal to the pre-driver sub-circuit 320 is delayed by t4r and causes a rising transition at the input of the inverter. The rising transition causes a falling (i.e., enabling) transition of the first signal of the non-overlapping enable signals (corresponding to a rising transition of the inverted first signal shown in FIG. 4B). The falling transition of the first signal enables the switching mechanism M4.

The "disabling" dead-time occurs between when the switching mechanism M4 is disabled by the first signal and the switching mechanism M3 is enabled by the second signal. The "enabling" dead-time occurs between when the switching mechanism M3 is disabled by the second signal and the switching mechanism M4 is enabled by the first signal. During the disabling and the enabling dead-times the switching mechanisms M3 and M4 are both disabled (i.e., the first signal is high and the second signal is low). Therefore, the current source is decoupled from both the current sink and the load. The enabling dead-time may be longer than the disabling dead-time to charge the parasitic capacitance at the drains of the switching mechanisms M3 and M4 between the current source and the voltage control mechanism by the current $I_{L1}$. When the switching mechanism M4 is an N-type MOS transistor, an inverted version of the first signal is coupled to the gate of the switching mechanism M4 (through a buffer and level shifter).

FIG. 4C illustrates a pre-driver sub-circuit 320 of a downstream controller 310 or 360, in accordance with one embodiment. The pre-driver sub-circuit 320 is adaptive, measuring a peak voltage level of $V_D$ while the electric power conversion device that includes the pre-driver sub-circuit 320 operates to regulate the voltage $V_L$ and dynamically controlling the timing of the non-overlapping enable signals. Because the pre-driver sub-circuit 320 is adaptive, it can compensate for variations in signal timing due to variations in silicon fabrication process, temperature, power supply voltage, and the like.

A fixed delay t3 is used to generate the second signal from the input D. An amplifier (i.e., exponential horn of a non-inverting buffer) is used to provide adequate drive to the switching mechanism M3. Separate adjustable delay lines, having configurable delays of t4r and t4f, control the enabling transition and the disabling transition of the first signal, respectively. The configurable delays may be implemented using digital delay lines. The switching mechanism M6 is configured to pull the first signal high when a version of D delayed by t4r falls and the switching mechanism M5 is configured to pull the first signal low when a version of D delayed by t4f rises. Another amplifier (i.e., exponential horn of an inverting buffer) is used to provide adequate drive to the switching mechanism M4.

A peak voltage detector (PVD) 425 detects voltage overshoot of $V_D$ at the parasitic capacitance CP where the drains of the switching mechanisms M3 and M4 are coupled to the current source. Voltage overshoot occurs when a peak voltage level of $V_D$ is greater than $V_L$. A controller 420 receives a peak voltage level from the PVD 425 and, based on the peak voltage level, the controller 420 produces signals dr and df. The signals dr and df are inputs to the configurable delays of t4r and t4f, respectively, which control the timing of the first signal. As the peak voltage level of $V_D$ changes, the controller 420 may be configured to adjust dr and df to reduce voltage overshoot and also avoid shoot-through current.

Figure 4D:
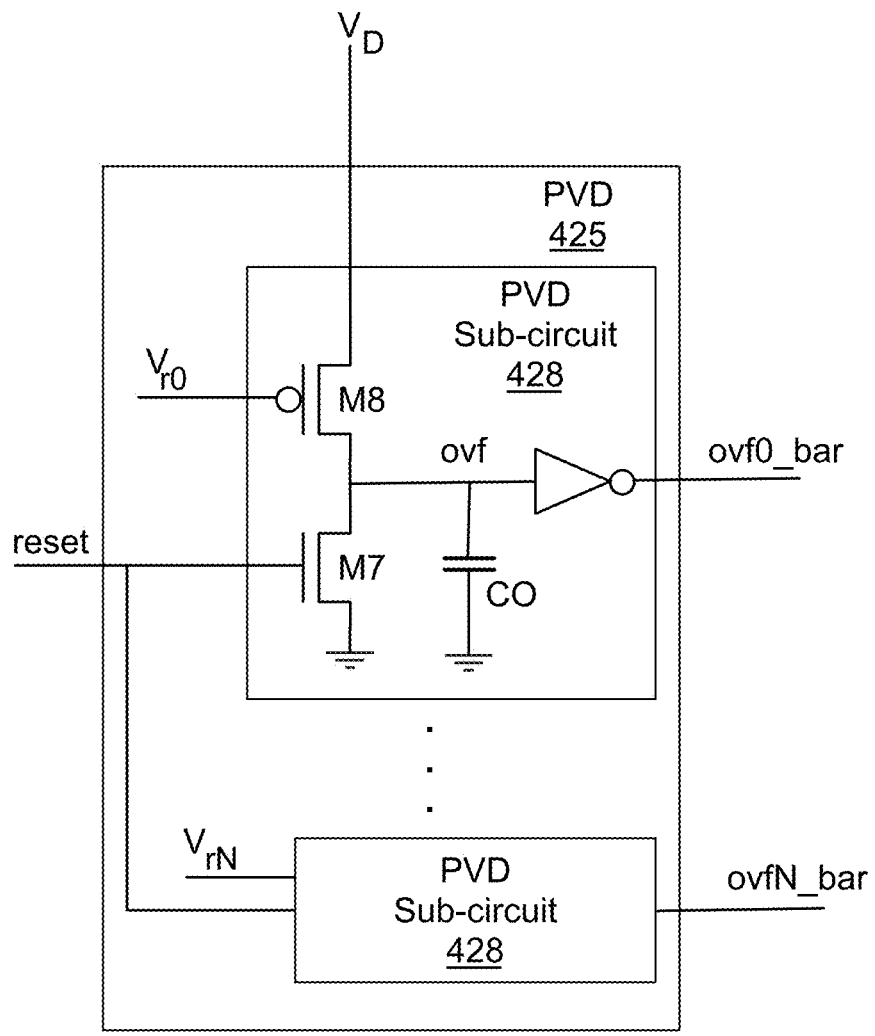
FIG. 4D illustrates a peak voltage detector of the pre-driver sub-circuit shown in FIG. 4C, in accordance with one embodiment.

FIG. 4D illustrates the PVD 425 of the pre-driver sub-circuit 320 shown in FIG. 4C that includes at least one PVD sub-circuit 428, in accordance with one embodiment. The PVD 425 may include multiple PVD sub-circuits 428. Each PVD sub-circuit 428 is configured to compare a reference voltage Vri to $V_D$, where the each reference voltage corresponds to a different peak voltage level for i=0 to N. In one embodiment, the reference voltages are set to values equal to or greater than Vmin and include at least one value that is greater than Vmax.

Before use, the controller 420 pulses the reset signal high to discharge the capacitor C0. If $V_D$ rises above Vri+$V_{Threshold}$, the switching mechanism M8 is enabled and the signal ovf is pulled high. An inverter generates the signal ovfi_bar that is output to the controller 420. The inverter provides isolation from the non-standard voltage on ovf. Separate PVD sub-circuits 428 can be configured for generating dr and df to adjust the enabling and disabling dead-times.

To set the delays of the delay elements t4r and t4f at startup, the controller 420 initially communicates with the upstream controller 305 which then generates a small inductor current $I_{L1}$. The controller 420 then sets dr and df to the conservative values, and verifies that there is no voltage overshoot for a voltage transient at $V_D$. A voltage transient occurs at $V_D$ on each cycle of the downstream controller 310 or 360 and the downstream controller 310 or 360 is configured to monitor $V_D$ and adjust the enabling and/or disabling dead-times so that the peak voltage level of $V_D$ is just greater than the desired $V_L$. The enabling dead-time is then incrementally increased until voltage overshoot is detected by the PVD 425 (i.e., one or more ovf signals goes high). The controller 420 then reduces the enabling dead-time by adjusting the dr signal to reduce the delay of t4r. A similar process is followed by the controller 420 to control the disabling dead-time by adjusting the df signal to change the delay of t4f.

Figure 4E:
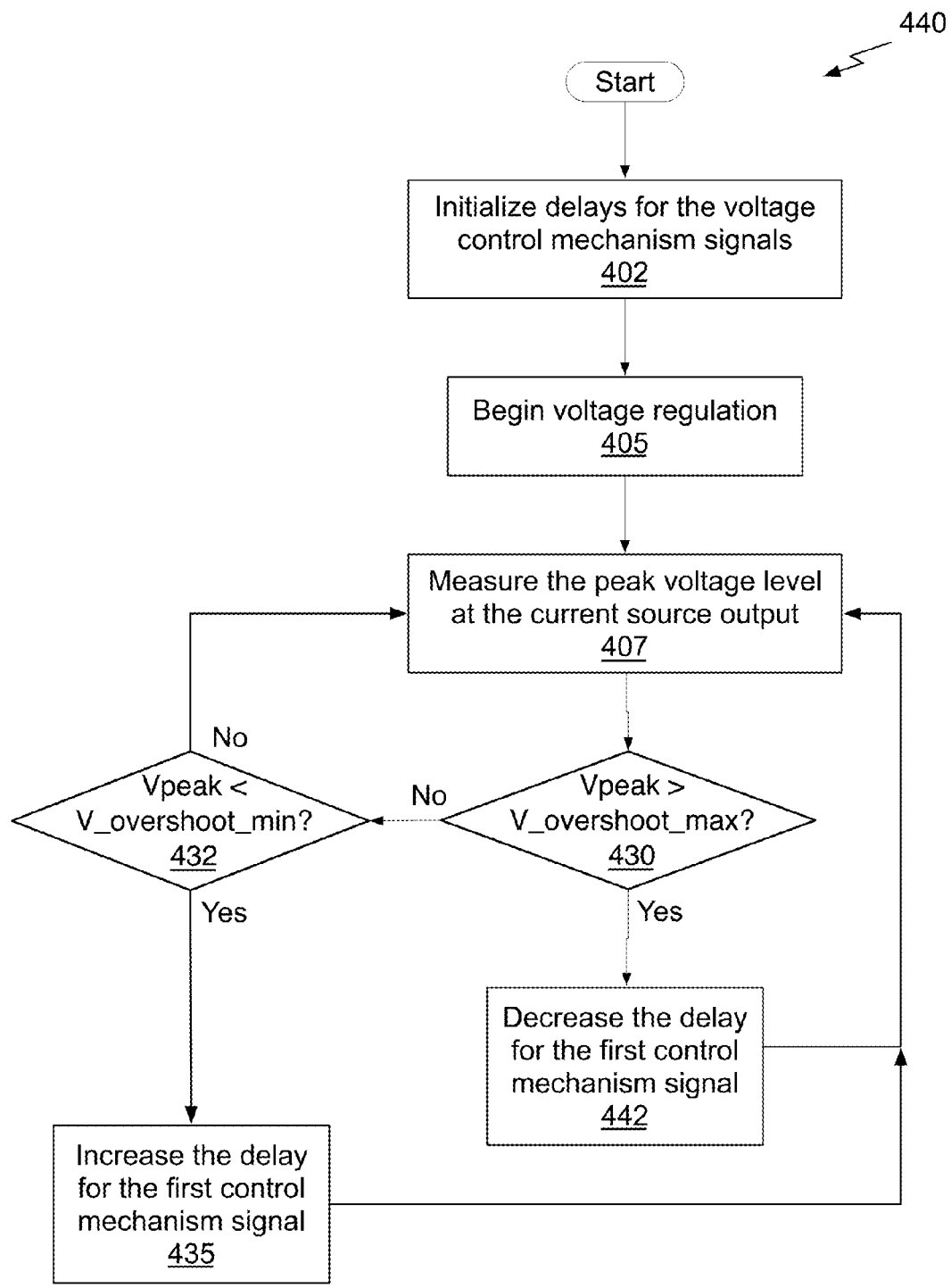
FIG. 4E illustrates another flowchart of a method for generating non-overlapping enable signals by a downstream controller, in accordance with one embodiment.

FIG. 4E illustrates another flowchart 400 of a method for generating non-overlapping enable signals by the pre-driver sub-circuit 320 within the downstream controller 310 or 360, in accordance with one embodiment. Steps 402 and 405 are performed as described in conjunction with FIG. 4A.

At step 407, the peak voltage level of $V_D$ is measured by the PVD 425 and indication of the peak voltage level(s) (i.e., ovfi_bar signals) are provided to the controller 420. In one embodiment, different reference voltages are specified for incrementing and decrementing t4r and t4f to detect voltage overshoot at different thresholds. When different thresholds are used, t4r and t4f may be constant over a range of peak voltage levels bounded by v_overshoot_min and v_overshoot_max. At step 430, the controller 420 determines if voltage overshoot occurs, i.e., the peak voltage level of $V_D$ (Vpeak) is greater than the level of a maximum overshoot voltage (V_overshoot_max) represented by at least one of the reference voltages Vri. When voltage overshoot occurs, the pre-driver sub-circuit 320 decreases the delay (t4r) incurred by a falling transition of the first signal of the non-overlapping signals at step 442. Decreasing the t4r delay reduces the enable dead-time.

If, at step 430, the controller 420 determines that voltage overshoot has not occurred, then at step 432, the controller 420 determines if the peak voltage level of $V_D$ (Vpeak) is less than the level of a minimum overshoot voltage (V_overshoot_min) represented by at least one of the reference voltages Vri. When Vpeak is not less than V_overshoot_min, then the pre-driver sub-circuit 320 does not change the t4r delay and returns to step 407. Otherwise, at step 435 the pre-driver sub-circuit 320 increases the t4r delay to lengthen the enabling dead-time. The controller 420 returns to step 407 to repeat the adaptive adjustment process after steps 435 and 442.

The disabling dead-time may be similarly reduced and lengthened based on the peak voltage level of $V_D$. However, the t4f delay that is incurred by a rising transition of the first signal is decreased to lengthen the disabling dead-time and t4f delay is increased to reduce the disabling dead-time. When Vpeak is greater than V_overshoot_max, the disabling dead-time should be reduced. The disabling dead-time may be increased when Vpeak is less than V_overshoot_min.

If non-volatile storage is available, a training process may be performed once and the delay line settings for each range of the inductor current $I_{L1}$ can be stored for future use. During the training process the current in $I_{L1}$ is incremented and the level of $V_D$ is measured by the PVD 425 for each setting of $I_{L1}$. When the training process is complete, the dr and df delay settings generated by the controller 420 for each range of $I_{L1}$ are stored, and the controller 420 may select the dr and df values based on $I_{L1}$ to avoid shoot-through current and voltage overshoot. Note that the enabling delay is current dependent, but to first approximation, the disabling delay should be independent of the current $I_{L1}$.

Figure 4F:
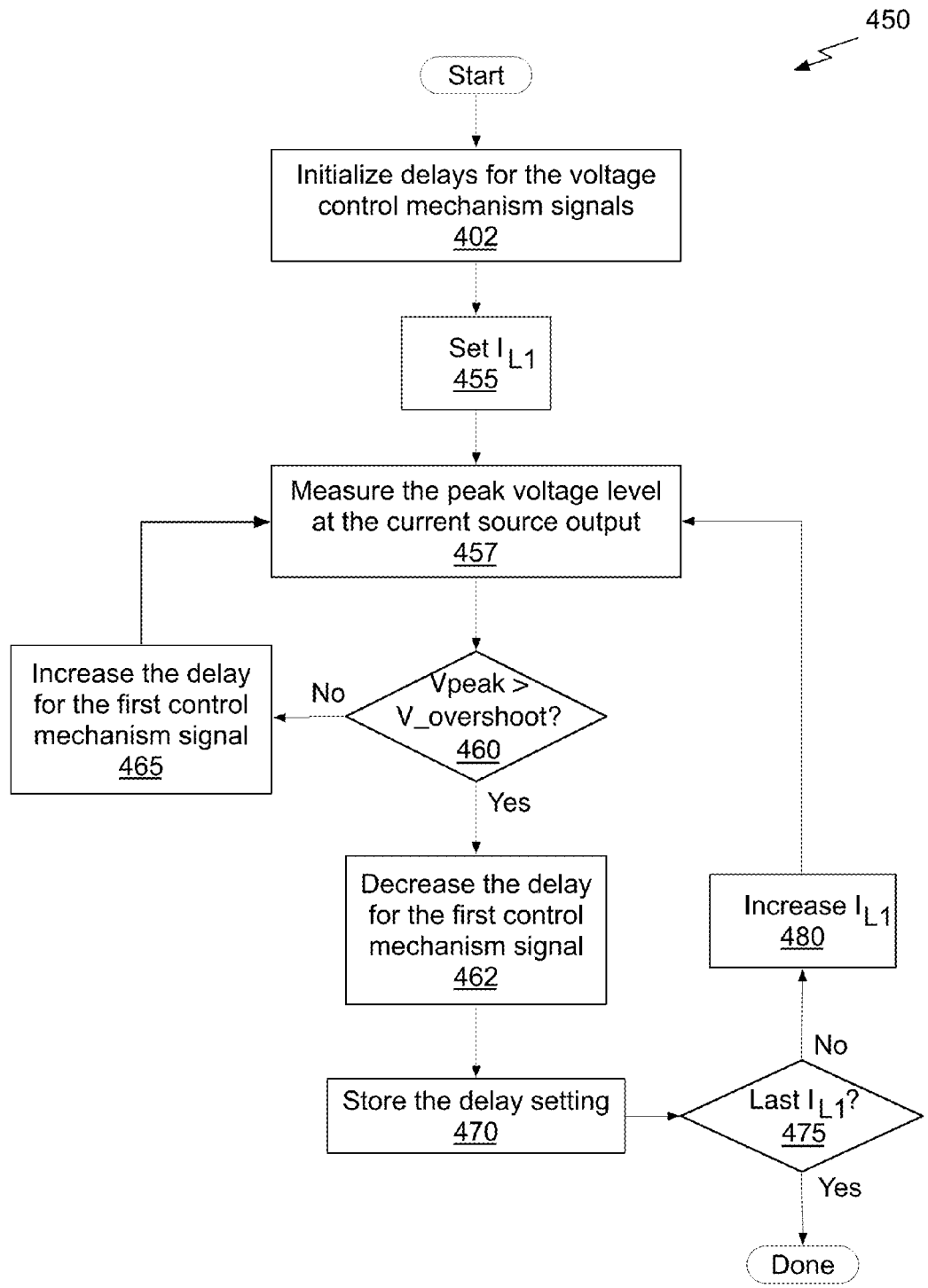
FIG. 4F illustrates another flowchart of a method for performing a training process for generating non-overlapping enable signals, in accordance with one embodiment.

FIG. 4F illustrates another flowchart 450 of a method for performing the training process, in accordance with one embodiment. At step 402, the delay settings for dr and df are initialized to conservative values to control the relative timing of the non-overlapping enable signals. At step 455, the current $I_{L1}$ is set to a low value. At step 457, the peak voltage level of $V_D$ is measured by the PVD 425 and indication of the peak voltage level(s) (i.e., ovfi_bar signals) are provided to the controller 420. At step 460, the controller 420 determines if Vpeak is greater than V_overshoot, and, if not, at step 465, the controller 420 increases the t4r delay to increase the enabling dead-time and returns to step 457.

If, at step 460, the controller 420 determines that Vpeak is greater than V_overshoot, then, at step 462, the controller 420 decreases the t4r delay to reduce the enabling dead-time. At step 470, the controller 420 stores the delay setting dr for t4r corresponding to the current $I_{L1}$. In one embodiment, at least two reference voltages are specified for each of t4r and t4f, so that t4r and t4f may be constant over a range of peak voltage levels bounded by v_overshoot_min and v_overshoot_max. At step 475, the controller 420 determines if the last (i.e., maximum) current value $I_{L1}$ has been provided, and, if so, the training process is complete. Otherwise, at step 480, the current $I_{L1}$ is increased and the controller 420 returns to step 457.

Figure 5A:
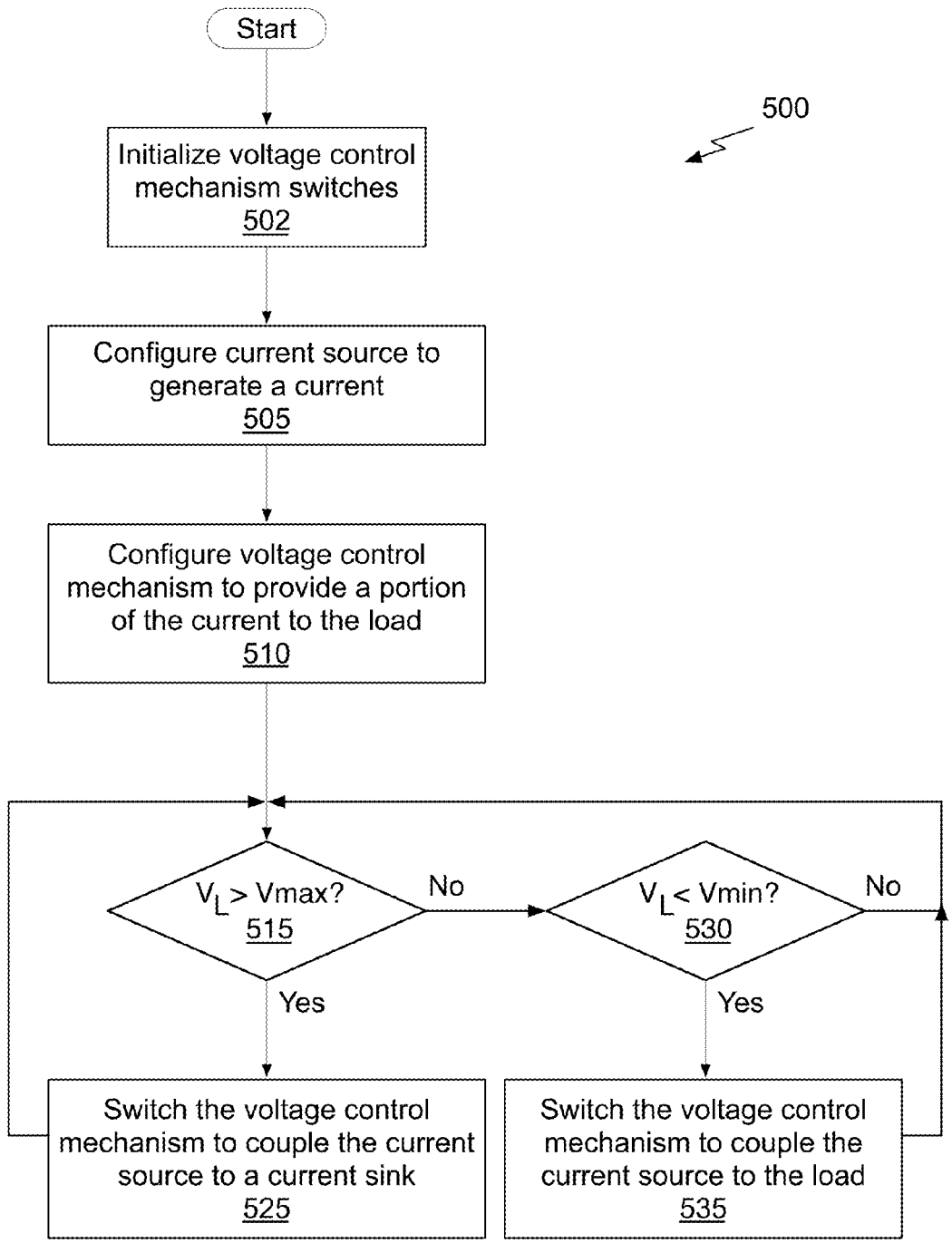
FIG. 5A illustrates another flowchart of a method for regulating the voltage level provided to a load, in accordance with one embodiment.

FIG. 5A illustrates another flowchart 500 of a method for regulating the voltage level provided to the load 110 or 170 using the downstream controller 310 or 360 (or the controller 105 or 165 that includes a downstream controller), in accordance with one embodiment. At step 502, the switching mechanisms in the voltage control mechanism are initialized. Specifically, the switching mechanism M3 is disabled and the switching mechanism M4 is enabled. In another embodiment, the auxiliary supply voltage $V_{ST}$ is provided to the downstream controller, and step 502 is replaced with a step that provides the auxiliary supply to the downstream controller before the electric power 108 source provides a supply voltage to the current source.

At step 505, the upstream controller 305 (or controller 105 or 165) configures the current control mechanism to generate the current $I_{L1}$ through the inductor L1. The current control mechanism may be configured to provide a current that is greater than an average current needed by the load 110 or 170. At step 510, the downstream controller configures the voltage control mechanism to provide a portion of the current to the load 110 or 170 to regulate the voltage level, $V_L$ at the load 110. At step 515, the downstream controller determines if $V_L$ is greater than Vmax, and, if so, then at step 525, the voltage control mechanism is switched to decouple the current source from the load 110 or 170 and to couple the current source (i.e., the inductor L1) to a current sink (i.e., ground) to provide a lesser portion of $I_{L1}$ to the load 110 or 170 to reduce $V_L$. After step 525, the downstream controller returns to step 515.

If, at step 515, $V_L$ is not greater than Vmax, then at step 530, the downstream controller determines if $V_L$ is less than Vmin. If $V_L$ is less than Vmin, then at step 535 the downstream controller configures the voltage control mechanism to couple the current source to the load 110 or 170 and to decouple the current source from the current sink to provide a greater portion of $I_{L1}$ to the load 110 or 170 to increase $V_L$. After step 535, the downstream controller returns to step 515. Otherwise, when $V_L$ is not greater than Vmax and is not less than Vmin (i.e., $V_L$ is within the range bounded by Vmin and Vmax), then the downstream controller returns to step 515.

The portion of the current that is provided to the load 110 or 170 is determined by the signal D that is generated by the downstream controller 310 or 360. The signal D that alternately enables the first switching mechanism M4 allowing a portion of the current to flow to the load 110 or 170 while disabling a second switching mechanism M3 and then enables the second switching mechanism to pull the inductor L1 (or L2 for the electric power conversion device 180) to ground while disabling the second switching mechanism to isolate the load 110 or 170 from the inductor. In response to a current transient, the downstream controller 310 or 360 quickly increases or decreases the portion of the current that is provided to the load 110 or 170 and maintains the voltage level $V_L$ within a predetermined range bounded by Vmin and Vmax. Specifically, when $V_L$ is greater than Vmax, D goes low to divert current away from load 170 and when $V_L$ is less than Vmin, D goes high to source current to the load 170.

Figure 5B:
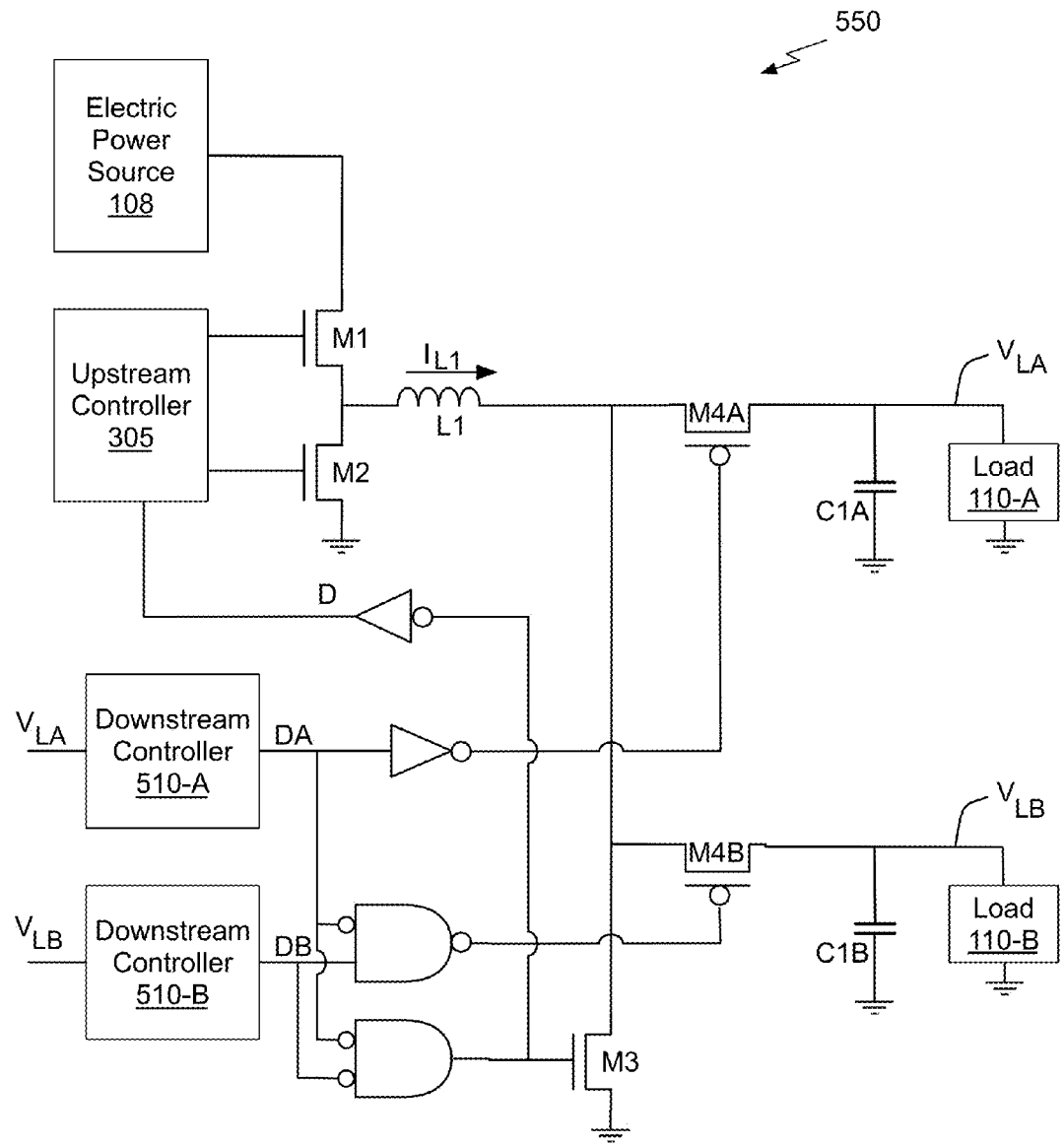
FIG. 5B illustrates a system including a current-parking switching regulator driving two loads using a shared current source, according to one embodiment.

FIG. 5B illustrates a system 550 including a current-parking switching regulator driving two loads, loads 110-A and 110-B, with independently controller voltages $V_{LA}$ and $V_{LB}$ using a shared current source, according to one embodiment. As shown in FIG. 5B, the single inductor L1 provides the current $I_{L1}$, a portion of which is provided to each of the two loads 110-A and 110-B. In one embodiment, the portions of the current $I_{L1}$ are not provided to the two loads 110-A and 110-B simultaneously. A filter capacitor C1A is coupled to the load 110-A and a filter capacitor C1B is coupled to the load 110-B. A separate downstream controller 510-A and 510-B and respective switching mechanism M4A and M4B is associated with each of the loads. However, the switching mechanism M3 may be shared by the downstream controllers 510-A and 510-B. The downstream controllers 510-A and 510-B may each be one of the downstream controllers 310 or 360.

The D output signals, DA and DB that are generated by the downstream controllers 510-A and 510-B are combined to give operating priority to the load 110-A. In one embodiment, load 110-A is the most critical or highest-current load. When DA is high, the switching mechanism M4A is enabled, coupling the current source to the load 110-A and the switching mechanisms M4B and M3 are both disabled. When the switching mechanism M4A is enabled the current $I_{L1}$ is provided to capacitor C1A and $V_{LA}$ ramps up while $V_{LB}$ ramps down. When DA is low DB may be high, enabling the switching mechanism M4B and disabling the switching mechanisms M4A and M3. When the switching mechanism M4B is enabled current $I_{L1}$ is provided to capacitor C1B and $V_{LB}$ ramps up while $V_{LA}$ ramps down. When DA and DB are both low, the switching mechanism M3 is enabled and both switching mechanisms M4A and M4B are disabled causing the current $I_{L1}$ to be "parked" in the inductor L1 while both $V_{LA}$ and $V_{LB}$ ramp down. The effective duty factor of the system 550 is the duty factor of the signal formed by the logical "OR" of DA and DB, shown in FIG. 5B as the signal D.

Figure 5C:
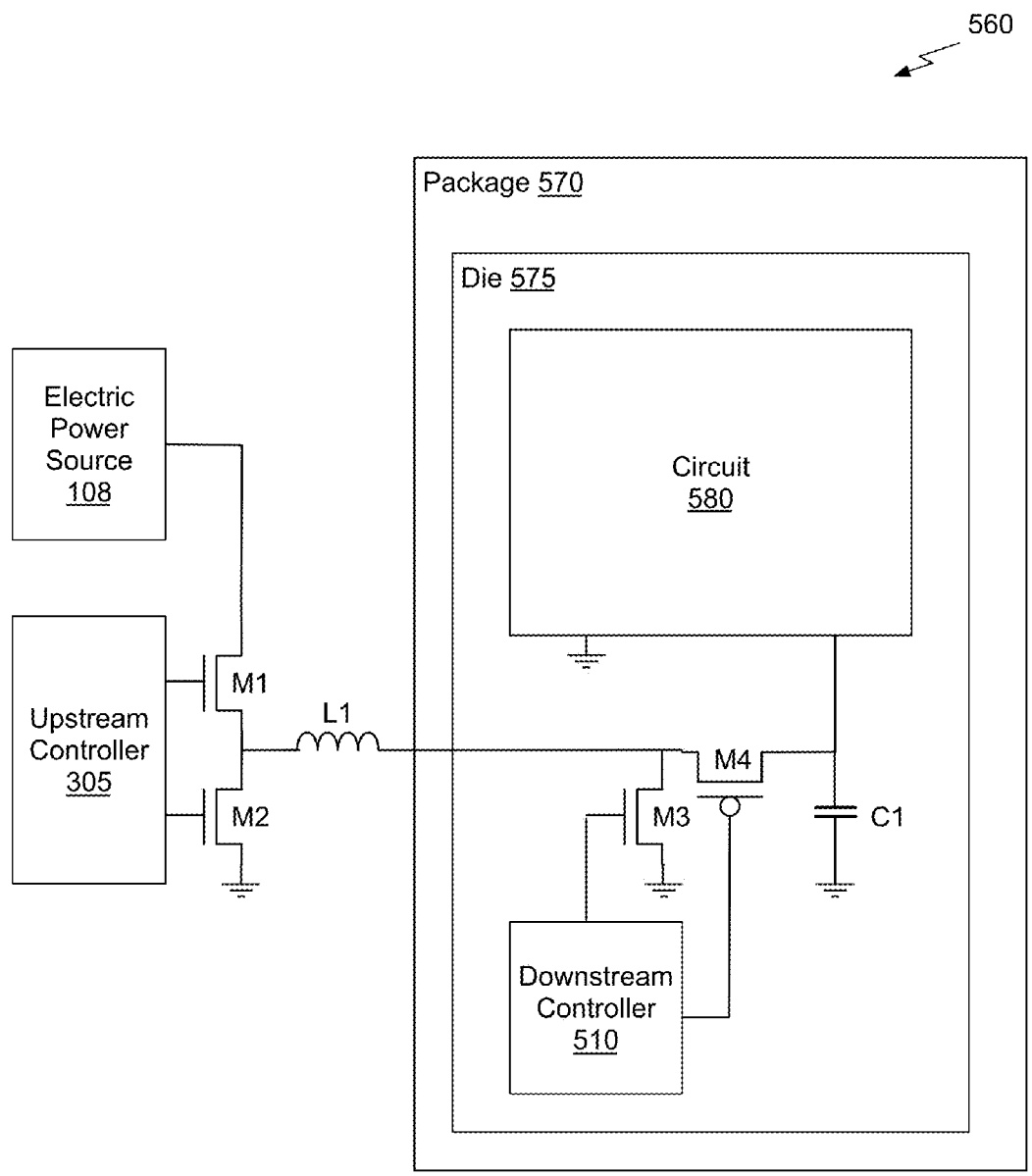
FIG. 5C illustrates a diagram of the current-parking switching regulator within a system, according to one embodiment.

FIG. 5C illustrates a system 560 including a current-parking switching regulator, according to one embodiment. The current-parking switching regulator in the system 560 may be one of the electric power conversion devices 120 and 180 shown in FIGS. 1A and 1C, respectively, or one of the current-parking switching regulators shown in FIGS. 3A, 3C, and 4A.

The electric power source 108 is coupled to the current control mechanism and the voltage control mechanism of the current-parking switching regulator with the inductor L1. In an alternate embodiment, the electric power source 108 is coupled to the current control mechanism and the voltage control mechanism of the current-parking switching regulator with the inductors L11 and L2. The upstream controller 305 is configured to generate a current through the inductor L1. The downstream controller 510 may be one of the downstream controllers 310 or 360 and is configured to regulate the voltage level at the load, i.e., circuit 580. In one embodiment, the downstream controller 510 is configured to maintain the voltage level at the circuit 580 within a predetermined range bounded by Vmin and Vmax.

The inductor L1 is positioned outside of a package 570 that encloses the circuit 580. A second inductor L2 (not shown) may be positioned inside of the package 570, reducing the second parasitic capacitance CPB compared with the first parasitic capacitance CPA, as described in conjunction with FIG. 1C. The second inductor L2, the switching mechanisms M3 and M4 (or M13 and M14), and the capacitor C1 (or C11) may be fabricated as part of the die 575 that includes the circuit 580. In one embodiment, the second inductor L2 a planar air-core inductor and the switching mechanisms M3 and M4 (or M13 and M14) are planar MOS transistors. Although a single phase of the current-parking switching regulator with a split inductor is shown in FIG. 5B, multiple phases of the current-parking switching regulator with a split inductor or a combination of one or more current-parking switching regulators (with or without a split inductor) may be used with one or more conventional electric power conversion devices to provide power to the circuit 580.

Figure 6:
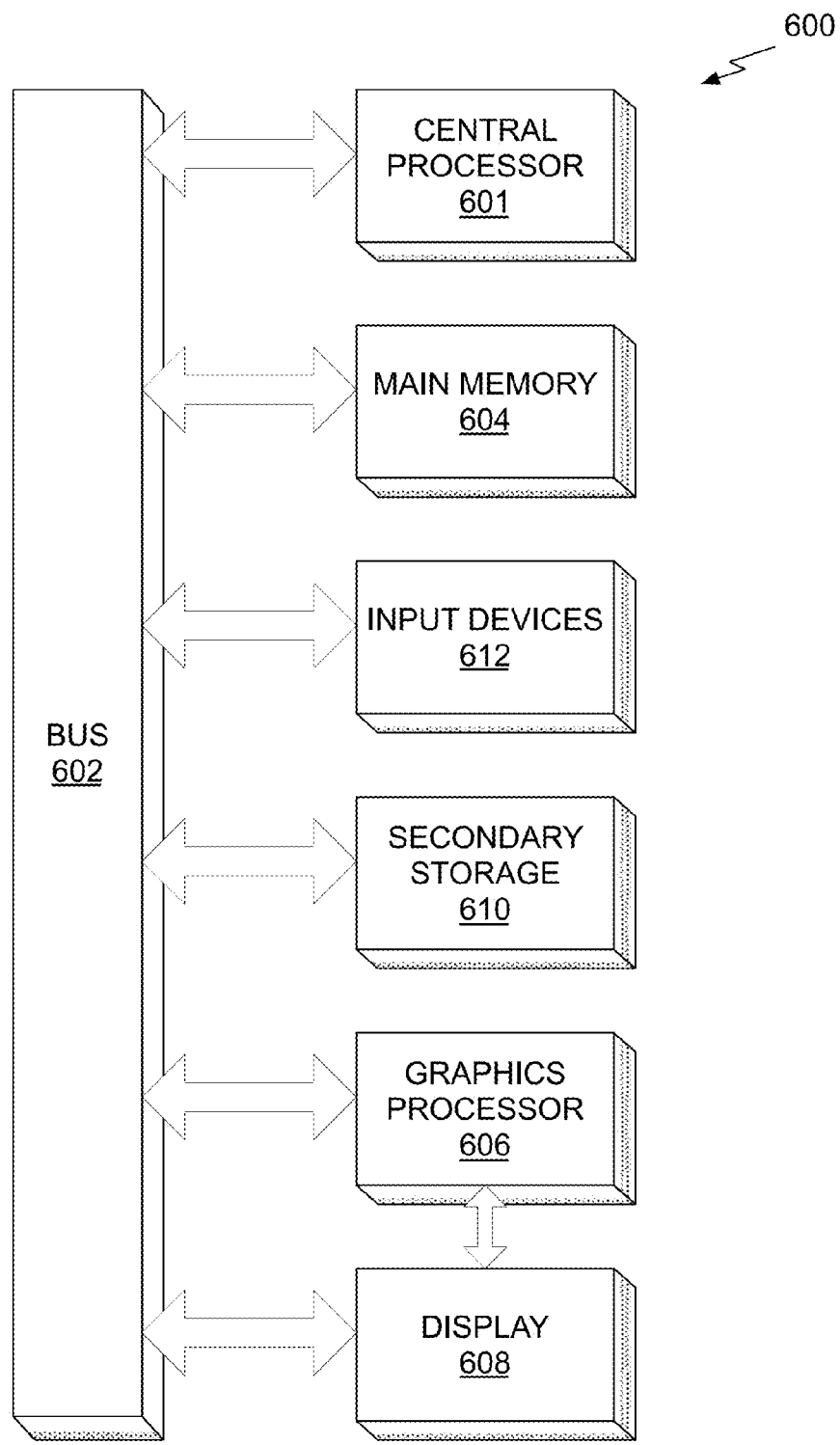
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the systems 550 and 500 shown in FIGS. 5A and 5B, respectively, may be incorporated in the system 600 to provide power to one or more of the chips.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 604 and/or the secondary storage 610. Such computer programs, when executed, enable the system 600 to perform various functions. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
measuring a peak voltage level at an output of a current source that is configured to provide a current to a voltage control mechanism, wherein the output of the current source is a downstream end of an inductor and an upstream end of the inductor is coupled to a current control mechanism;
generating non-overlapping enable signals for the voltage control mechanism, wherein the non-overlapping enable signals provide a portion of the current to a load at an output of the voltage control mechanism and the non-overlapping enable signals decouple the current source from both the load and a current sink during a dead-time; and
adjusting the portion of the current provided to the load by changing a length of the dead-time in response to determining that the peak voltage level is less than a minimum voltage level or greater than a maximum voltage level.

2. The method of claim 1, wherein a first signal of the non-overlapping enable signals couples and decouples the current source to the load.

3. The method of claim 2, wherein a second signal of the non-overlapping enable signals couples and decouples the current source to the current sink.

4. The method of claim 1, further comprising decreasing a delay incurred by an enabling transition of a first signal of the non-overlapping enable signals when the peak voltage level is greater than a voltage at the load.

5. The method of claim 1, further comprising increasing a delay incurred by a disabling transition of a first signal of the non-overlapping enable signals when the peak voltage level is less than a voltage at the load.

6. The method of claim 1, further comprising decreasing the dead-time when the peak voltage level is greater than a voltage at the load.

7. The method of claim 1, further comprising increasing the dead-time when the peak voltage level is less than a voltage at the load.

8. The method of claim 1, wherein a first dead-time during which the non-overlapping enable signals decouple the current source from both the load and the current sink before an enabling transition of a first signal of the non-overlapping enable signals differs from a second dead-time during which the non-overlapping enable signals decouple the current source from both the load and the current sink after a disabling transition of the first signal.

9. The method of claim 1, further comprising:
setting a first delay that is incurred by an enabling transition of a first signal of the non-overlapping enable signals; and
setting a second delay that is incurred by a disabling transition of the first signal, wherein the first delay and the second delay are different values.

10. The method of claim 1, further comprising:
initializing a delay setting that controls relative timing of the non-overlapping enable signals;
measuring the peak voltage level at the output of the current source for different values of the current; and
generating a set of delay settings, wherein each delay setting in the set of delay settings corresponds to a different value of the current.

11. The method of claim 10, further comprising storing the delay settings corresponding to the different values of the current.

12. The method of claim 1, wherein a frequency of the non-overlapping enable signals changes in response to a change in current demand at the load.

13. The method of claim 1, wherein the dead-time is lengthened in response to determining that the peak voltage level is less than a minimum voltage level.

14. The method of claim 1, wherein the dead-time is reduced in response to determining that the peak voltage level is greater than a maximum voltage level.

15. An electric power conversion device, comprising:
a voltage control mechanism that is coupled between a load and an output of a current source that provides a current to the voltage control mechanism, wherein the output of the current source is a downstream end of an inductor and an upstream end of the inductor is coupled to a current control mechanism; and
a downstream controller that is coupled to the voltage control mechanism and is configured to:
measure a peak voltage level at the output of the current source;
generate non-overlapping enable signals for the voltage control mechanism, wherein the non-overlapping enable signals provide a portion of the current to the load and the non-overlapping enable signals decouple the current source from both the load and a current sink during a dead-time; and
adjust the portion of the current provided to the load by changing a length of the dead-time in response to determining that the peak voltage level is less than a minimum voltage level or greater than a maximum voltage level.

16. The electric power conversion device of claim 15, wherein the downstream controller is further configured to decrease the dead-time when the peak voltage level is greater than a voltage at the load.

17. The electric power conversion device of claim 15, wherein the downstream controller is further configured to increase the dead-time when the peak voltage level is less than a voltage at the load.

18. The electric power conversion device of claim 15, wherein the downstream controller is further configured to:
initialize a delay setting that controls relative timing of the non-overlapping enable signals;
measure the peak voltage level at the output of the current source for different values of the current; and
generate a set of delay settings, wherein each delay setting in the set of delay settings corresponds to a different value of the current.

19. The electric power conversion device of claim 18, further comprising a non-volatile storage that is configured to store the delay settings corresponding to the different values of the current.

20. The electric power conversion device of claim 15, wherein the downstream controller is further configured to lengthen the dead-time in response to determining that the peak voltage level is less than a minimum voltage level.

21. The electric power conversion device of claim 15, wherein the downstream controller is further configured to reduce the dead-time in response to determining that the peak voltage level is greater than a maximum voltage level.

22. The electric power conversion device of claim 15, wherein the downstream controller is further configured to change a frequency of the non-overlapping enable signals in response to a change in current demand at the load.

* * * * *